US012565953B2

(12) United States Patent
Doi et al.

(10) Patent No.: US 12,565,953 B2
(45) Date of Patent: Mar. 3, 2026

(54) FITTING NUT, FITTING, FLUID PRESSURE DEVICE, AND FLUID CONTROL SYSTEM

(71) Applicant: SMC CORPORATION, Tokyo (JP)

(72) Inventors: Yoshitada Doi, Koshigaya (JP); Yuzuru Okita, Tsukubamirai (JP); Yoji Niimi, Tsukubamirai (JP); Hirofumi Ueda, Moriya (JP); Tsugumichi Fujiwara, Moriya (JP)

(73) Assignee: SMC CORPORATION, Tokyo (JP)

( * ) Notice: Subject to any disclaimer, the term of this patent is extended or adjusted under 35 U.S.C. 154(b) by 860 days.

(21) Appl. No.: 17/026,396

(22) Filed: Sep. 21, 2020

(65) Prior Publication Data

US 2021/0095801 A1    Apr. 1, 2021

(30) Foreign Application Priority Data

Sep. 30, 2019    (JP) ................................. 2019-178168

(51) Int. Cl.
| | |
|---|---|
| *F16L 33/24* | (2006.01) |
| *B25B 13/50* | (2006.01) |
| *F16B 23/00* | (2006.01) |

(52) U.S. Cl.
CPC .......... *F16L 33/24* (2013.01); *B25B 13/5033* (2013.01); *F16B 23/0061* (2013.01)

(58) Field of Classification Search
CPC ......... F16L 33/24; F16L 33/223; F16L 19/02; F16L 47/041; F16L 55/00; B25B 13/5033; B25B 13/08; F15B 23/0061
See application file for complete search history.

(56) References Cited

U.S. PATENT DOCUMENTS

| | | | |
|---|---|---|---|
| 2,685,219 A | 8/1954 | Diebold | |
| 3,059,513 A | 10/1962 | Ness | |
| 4,508,374 A * | 4/1985 | Kantor | ................ F16L 19/0283 |
| | | | 285/423 |

(Continued)

FOREIGN PATENT DOCUMENTS

| | | |
|---|---|---|
| DE | 20 2008 008 213 U1 | 8/2008 |
| JP | 60-500096 A | 1/1985 |

(Continued)

OTHER PUBLICATIONS

EP 1022504 A1 (Burli, Kurt), Foreign reference and machine translation, publication date Jul. 26, 2000 (Year: 2000).*

(Continued)

*Primary Examiner* — Craig M Schneider
*Assistant Examiner* — Andrew J Rost
(74) *Attorney, Agent, or Firm* — Oblon, McClelland, Maier & Neustadt, L.L.P.

(57) ABSTRACT

A fitting nut made of a resin material includes: a hollow, large-diameter tube portion having a female thread formed on its inner peripheral wall; and a small-diameter tube portion that is continuous to the large-diameter tube portion and having a hollow cylindrical shape with a smaller diameter than the large-diameter tube portion. The small-diameter tube portion includes, in the outer peripheral wall thereof, a plurality of engagement grooves that are depressed inwardly in the diameter direction of the small-diameter tube portion and extend along the longitudinal direction that is orthogonal to the diameter direction.

18 Claims, 18 Drawing Sheets

(56) References Cited

U.S. PATENT DOCUMENTS

| | | | | | |
|---|---|---|---|---|---|
| 5,200,575 A * | 4/1993 | Sheehan | H02G 3/0675 | | |
| | | | 174/541 | | |
| 5,971,296 A * | 10/1999 | Fukano | B05B 1/28 | | |
| | | | 251/63.5 | | |
| 7,070,160 B2 * | 7/2006 | Ijichi | F16K 31/1266 | | |
| | | | 251/282 | | |
| 7,340,939 B2 * | 3/2008 | Jansen | G01N 1/26 | | |
| | | | 73/23.31 | | |
| 8,459,698 B2 * | 6/2013 | Magargal | F16L 37/148 | | |
| | | | 239/200 | | |
| 8,733,399 B2 * | 5/2014 | Hasunuma | F16K 31/047 | | |
| | | | 137/637.4 | | |
| 9,452,511 B2 | 9/2016 | Nguyen | | | |
| 2004/0100097 A1 * | 5/2004 | Fukano | F16L 47/041 | | |
| | | | 285/322 | | |
| 2008/0061551 A1 * | 3/2008 | Simmons | F16L 19/025 | | |
| | | | 285/249 | | |
| 2011/0260450 A1 * | 10/2011 | Imanishi | F16L 19/028 | | |
| | | | 285/334.5 | | |
| 2014/0210205 A1 * | 7/2014 | Yamada | F16L 47/041 | | |
| | | | 285/386 | | |

FOREIGN PATENT DOCUMENTS

| | | | |
|---|---|---|---|
| JP | 9-189385 A | 7/1997 | |
| JP | 2003-108261 A | 4/2003 | |
| JP | 2010-127459 A | 6/2010 | |
| JP | 2011-196398 A | 10/2011 | |
| JP | 2014-145396 A | 8/2014 | |
| JP | 2014-145397 A | 8/2014 | |
| JP | 2016-17543 A | 2/2016 | |
| JP | 2019-148319 A | 9/2019 | |

OTHER PUBLICATIONS

Extended European Search Report issued on Nov. 17, 2020 in European Patent Application No. 20198267.5, 10 pages.

Japanese Office Action issued Mar. 15, 2022 in Japanese Patent Application No. 2019-178168 (with English translation), 10 pages.

Combined Chinese Office Action and Search Report issued Jun. 30, 2023 in Chinese Application 202011038931.2, (with unedited computer-generated English translation), 33 pages.

Office Action mailed Dec. 16, 2024, in co-pending U.S. Appl. No. 18/632,692.

Office Action mailed Jun. 18, 2025, in co-pending U.S. Appl. No. 18/632,692.

* cited by examiner 14a (14b, 14c)

FIG. 10

FITTING NUT, FITTING, FLUID PRESSURE DEVICE, AND FLUID CONTROL SYSTEM

CROSS-REFERENCE TO RELATED APPLICATION

This application is based upon and claims the benefit of priority from Japanese Patent Application No. 2019-178168 filed on Sep. 30, 2019, the contents of which are incorporated herein by reference.

BACKGROUND OF THE INVENTION

Field of the Invention

The present invention relates to a fitting nut for connecting a joint body and a pipe member for sending a fluid, a fitting including the joint body and the fitting nut, a fluid pressure device including the fitting, and a fluid control system including a plurality of the fluid pressure devices, and to a nut turning tool suitable to turn the fitting nut, and a method for turning the fitting nut.

Description of the Related Art

Apparatuses for manufacturing semiconductors, medical products, etc. or for processing foods etc., for example, are supplied with high-purity medical fluids, ultrapure water, etc. from supply sources. A flow rate control valve, which is one type of a fluid pressure device, is interposed in the piping. A fluid supply pipe is interposed between the supply source and the flow rate control valve, while a fluid discharge pipe is interposed between the flow rate control valve and the manufacturing or processing apparatus etc. The fluid supply pipe or fluid discharge pipe and the flow rate control valve are connected together through a fitting.

The fitting is formed by engaging a female thread formed on the inner periphery of a first joint member with a male thread formed on the outer periphery of a second joint member. As is well known, the male screw is screwed into the female screw by turning the first joint member or the second joint member by means of a suitable tool, like a spanner, wrench, or the like.

Recently, a plurality of flow rate control valves may be arranged in a concentrated manner in order to make the manufacturing apparatus etc. compact. In such a case, the fittings of the individual flow rate control valves are disposed densely. Under such circumstances, if a tool is turned to attach a fluid supply pipe or a fluid discharge pipe to the flow rate control valve, then the tool will be interfered with by another fitting. Then, it will be difficult to further turn, in other words, to tighten the female nut or male nut. It is also difficult, for the same reason, to turn the female nut or male nut in the reverse direction to release the engagement therebetween.

Japanese Laid-Open Patent Publication No. 2019-148319 proposes a screwed joint (fitting) for solving the above problem. The screwed joint includes a female nut as the first joint member and a male nut as the second joint member. The female nut includes a torque-applied portion shaped in a regular hexagon when seen in plan view from a direction perpendicular to its axial direction, and a cylindrical, maximum outer diameter portion having a female thread formed on its inner periphery. On the other hand, the male nut includes a cylindrical portion having a male thread formed on its outer periphery and a fixed portion shaped in a regular hexagon when seen in plan view from the direction perpendicular to its axial direction. The distance between the opposing sides of the torque-applied portion and that of the fixed portion are set shorter than the outer diameter of the maximum outer diameter portion. A passage pipe in which fluid flows is passed through sleeves individually accommodated in the female nut and the male nut.

With this configuration, even when fittings are arranged densely, the pitch between adjacent torque-applied portions or between adjacent fixed portions is larger than the pitch between the maximum outer diameter portions. This is because, as mentioned above, the distance between the opposing sides of the torque-applied portion and that of the fixed portion are shorter than the outer diameter of the maximum outer diameter portion. It is therefore possible to turn the female nut or the male nut by holding the torque-applied portion or the fixed portion with a tool and turning the tool (by applying torque to the torque-applied portion or the fixed portion). The male thread and the female thread can be engaged together or released from engagement in either case.

SUMMARY OF THE INVENTION

As can be seen by referring to FIGS. 1, 2, 9 and 10 of Japanese Laid-Open Patent Publication No. 2019-148319, in the fluid supply system described in Japanese Laid-Open Patent Publication No. 2019-148319, supply/discharge pipes for supplying and discharging pilot fluids to open and close the flow rate control valves are provided in areas entirely different from the areas where the fluid supply pipes and fluid discharge pipes are provided. However, depending on the circumstance, a supply/discharge pipe and a fluid supply pipe, or a supply/discharge pipe and a fluid discharge pipe, may be arranged in a row. In such a case, the supply/discharge pipes are unavoidably arranged densely if the flow rate control valves are arranged in a concentrated manner. Consequently, the tool, which is turned as mentioned above, is likely to be interfered with by a supply/discharge pipe. It is then difficult to further turn, in other words, to tighten the female nut or male nut.

A main object of the present invention is to provide a fitting nut that can be tightened even in a small space, for example when supply/discharge pipes etc. are arranged in rows or when some members are disposed close to and opposite to the end surfaces thereof, a fitting including the same, a fluid pressure device to which a pipe member is connected through the fittings, and a fluid control system including a plurality of the fluid pressure devices, and a nut turning tool suitable to turn and tighten the fitting nut, and a fitting nut turning method using the same.

An embodiment of the present invention provides a fitting nut made of a resin material and having a female thread that is engaged with a male thread formed on an outer peripheral wall of a joint body made of a resin material, the fitting nut including:

a large-diameter tube portion that is hollow and includes the female thread formed on an inner peripheral wall thereof; and a small-diameter tube portion that is continuous to the large-diameter tube portion, has a hollow cylindrical shape with a smaller diameter than the large-diameter tube portion and includes, in an end surface thereof, an insertion hole in which a pipe member is inserted, wherein the small-diameter tube portion includes a plurality of engagement grooves formed in an outer peripheral wall thereof, the plurality of engagement grooves being depressed inwardly in a diameter direction of the small-diameter tube portion and extending along a longitudinal direction that is orthogonal to the diameter direction.

Another embodiment of the present invention provides a fitting including a fitting nut configured as described above.

A still another embodiment of the present invention provides a fluid pressure device in which at least one of a fluid supply pipe or a fluid discharge pipe in which a fluid flows, or a pilot fluid passage pipe through which a pilot fluid flows, is connected through a fitting configured as described above.

A still another embodiment of the present invention provides a fluid control system including a plurality of fluid pressure devices that are arranged in a row and provided with fitting nuts configured as described above.

A still another embodiment of the present invention provides a nut turning tool for turning a nut, the nut turning tool including:

an arc-shaped attachment portion shaped like an arc with an opening, the arc-shaped attachment portion being attached to the nut; and a shaft portion continuous to the arc-shaped attachment portion and extending linearly, wherein the arc-shaped attachment portion includes, on an inner surface thereof, one or more claws protruding toward the nut, and the arc-shaped attachment portion exhibits elasticity in a direction in which the opening is closed after being expanded.

A still another embodiment of the present invention provides a fitting nut turning method for turning a fitting nut using a nut turning tool configured as described above to thereby engage the fitting nut with a joint body or to release the engagement with the joint body, the fitting nut turning method including:

causing the fitting nut to enter an opening formed in an arc-shaped attachment portion of the nut turning tool, while expanding the opening with the fitting nut;

engaging a claw formed on an inner wall of the arc-shaped attachment portion with an engagement groove formed in an outer peripheral wall of the fitting nut, while, when the entry of the fitting nut into the opening ends, closing the opening by elasticity of the arc-shaped attachment portion to attach the arc-shaped attachment portion to the fitting nut; and applying thereafter torque to the fitting nut through a shaft portion of the nut turning tool to turn the fitting nut.

According to the present invention, the small-diameter tube portion having a smaller diameter than the large-diameter tube portion is formed contiguous to the large-diameter tube portion. Since the plurality of engagement grooves are formed around the small-diameter tube portion, a worker who turns the fitting nut can apply torque to the small-diameter tube portion by engaging the claws of the nut turning tool with the engagement grooves and turning the nut turning tool. The fitting nut can thus be turned easily.

Even in an area where the large-diameter tube portions are arranged adjacent to each other closely, relatively large clearance is formed between the small-diameter tube portions having a smaller diameter than the large-diameter tube portions. The nut turning tool can be easily inserted from the clearance so that the nut turning tool is fitted around the small-diameter tube portion and engaged therewith. It is thus possible to apply torque to the small-diameter tube portion to turn the fitting nut even in a small space. As a result, it is possible to firmly screw the female thread and the male thread together and to release the engagement between the female thread and the male thread.

Furthermore, the arc-shaped attachment portion of the nut tuning tool exhibits such elasticity as to act in the direction in which the opening is closed after being expanded. Accordingly, when attaching the arc-shaped attachment portion to a nut such as a fitting nut, the nut can be inserted in the arc-shaped attachment portion while the opening is expanded. It is thus possible to easily attach the arc-shaped attachment portion to the nut even in a small space.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 10 is a schematic perspective view of important part, in a state where a fitting nut (first nut) of an embodiment of the invention is being tightened (retightened or made tighter);

DESCRIPTION OF THE PREFERRED EMBODIMENTS

Figure 4:
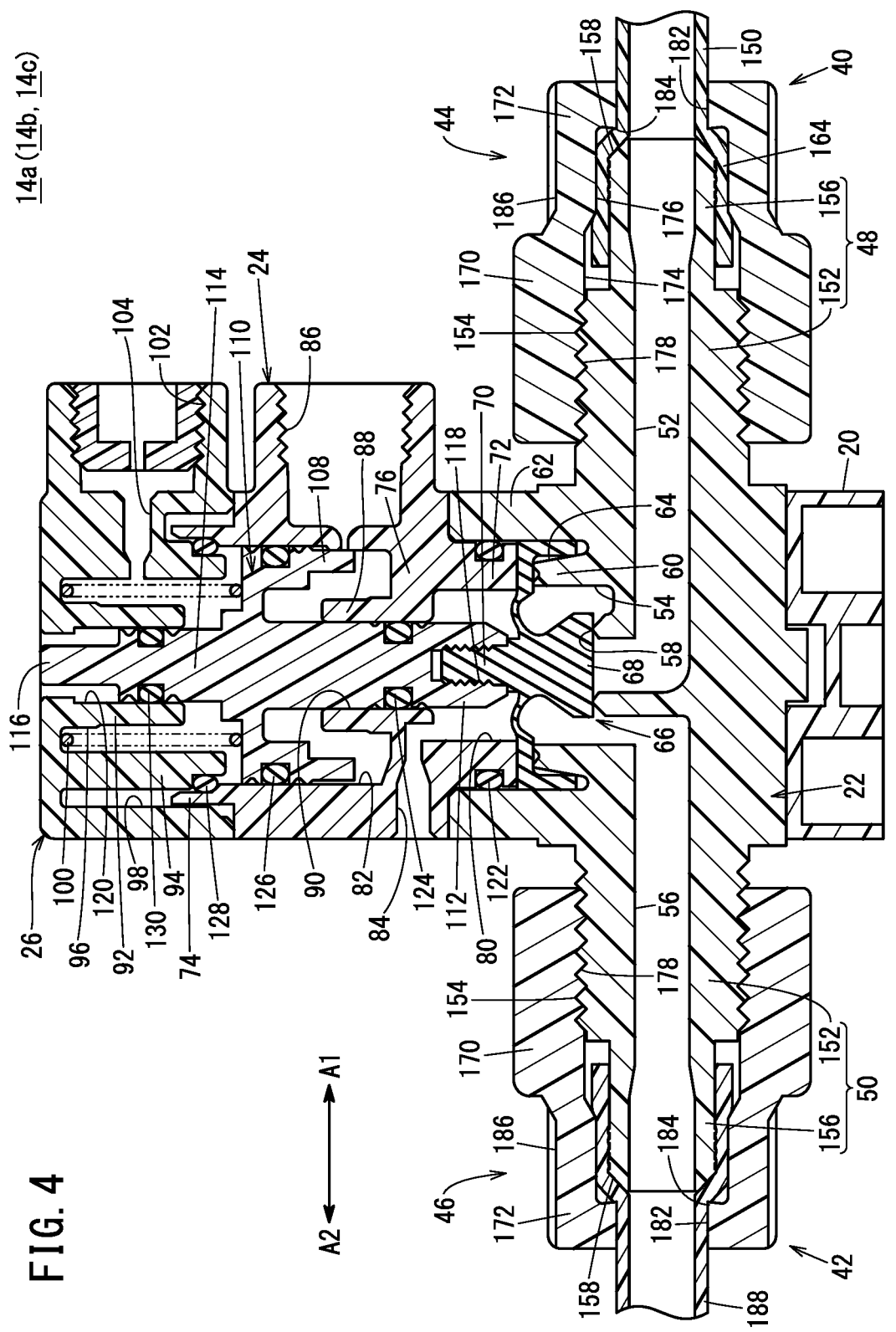
FIG. 4 is a schematic longitudinal cross section of the first air-operated valve.
Figure 15:
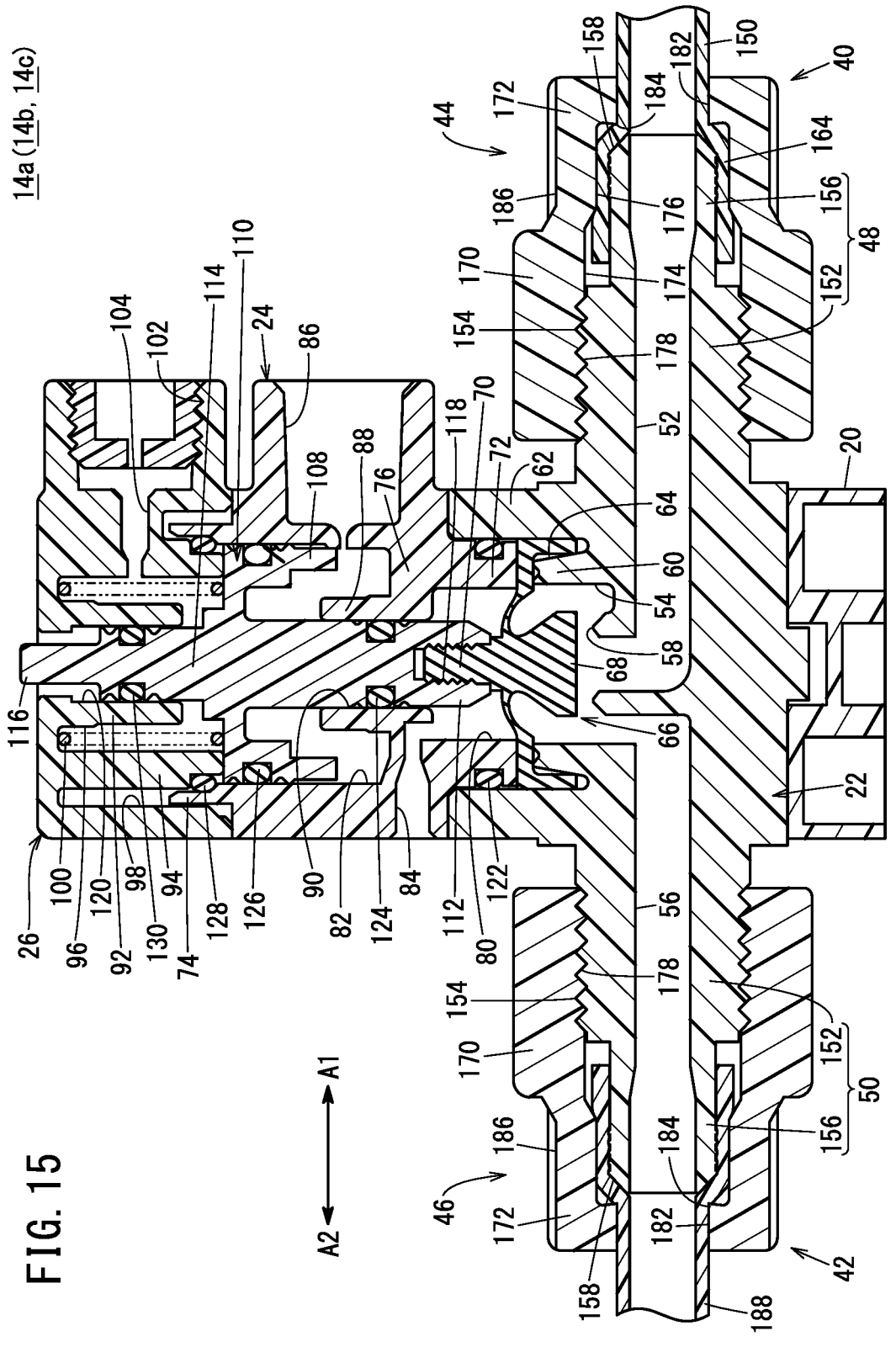
FIG. 15 is a schematic longitudinal cross section illustrating the first air-operated valve, where the first air-operate valve has been brought from the state of FIG. 4 to an opened state by a valve portion separating from a valve seat.

Now, the fluid pressure device and the fluid control system according to the present invention will be described in detail referring to the accompanying drawings, in connection with preferred embodiments illustrating the fittings including the fitting nuts and attached to the fluid pressure device, the nut turning tool for turning the fitting nut, and the fitting nut turning method using the same. It should be noted that, in the description below, terms like "downward" and "upward", which particularly correspond to the downward direction and upward direction in FIGS. 4 and 15, are used only for convenience in order to facilitate understanding. Such terms are not intended to specify directions in practical use of the fluid pressure device. It should also be noted that the pipes in which fluid or pilot fluid flows are all shown in cross section.

First, a fluid control system 10 shown in FIG. 1 will be described. The fluid control system 10 includes first to third air-operated valves 14a to 14c that are positioned and fixed on a base 12. The first to third air-operated valves 14a to 14c are air pressure devices (fluid pressure devices) that operate using compressed air as pilot fluid, and function as flow rate control valves for controlling the flow rates of fluids such as high-purity medical fluids, ultrapure water, etc.

The first to third air-operated valves 14a to 14c are configured as so-called normally-closed valves that are closed when pilot pressure does not act. When the first to third air-operated valves 14a to 14c are in an opened state, the fluids flow from the A1 side to the A2 side. The direction from A1 to A2 will hereinafter be referred to also as "flow direction". Accordingly, the wording "the upstream side of the flow direction" indicates the A1 side and "the downstream side of the flow direction" indicates the A2 side.

Figure 2:
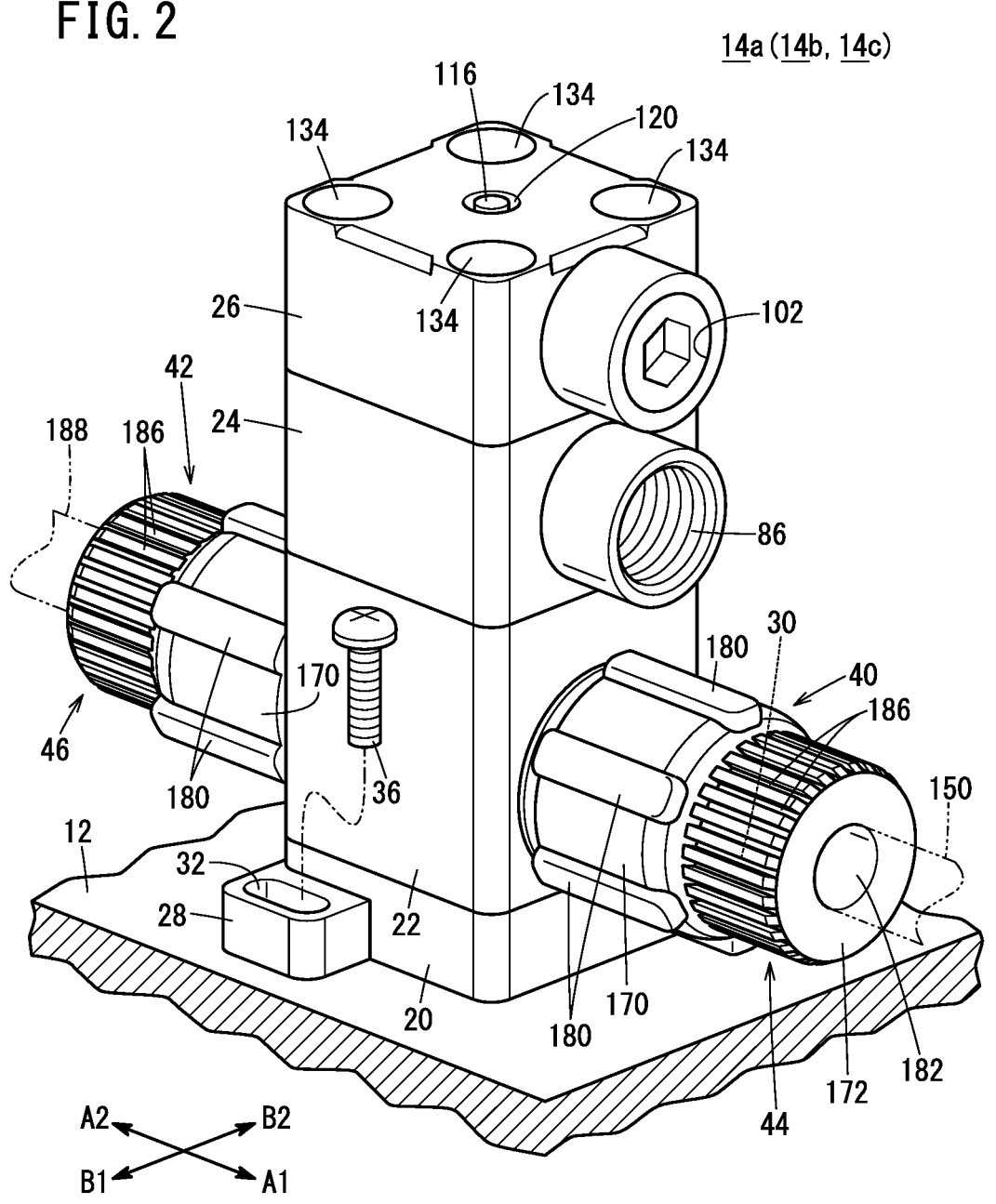
FIG. 2 is a schematic perspective view of the entirety of a first air-operated valve of the fluid control system.

The first air-operated valve 14a will now be described. As shown in the overall schematic perspective view of FIG. 2, the first air-operated valve 14a includes an end plate 20 (positioning and fixing member), a valve body 22, a first housing 24, and a second housing 26 in this order from the side of the base 12 (certain member). The first air-operated valve 14a has a vertically oriented, substantially rectangular parallelepiped shape, in which the end plate 20, the valve body 22, the first housing 24, and the second housing 26 are connected on the same axis line. The end plate 20, the valve body 22, the first housing 24, and the second housing 26 are all made of resin material. Preferred examples of the resin material include chemical-resistant and heat-resistant fluorine compound resins, such as polytetrafluoroethylene, polyvinylidene fluoride, perfluoroalkoxy alkane, etc.

Figure 3:
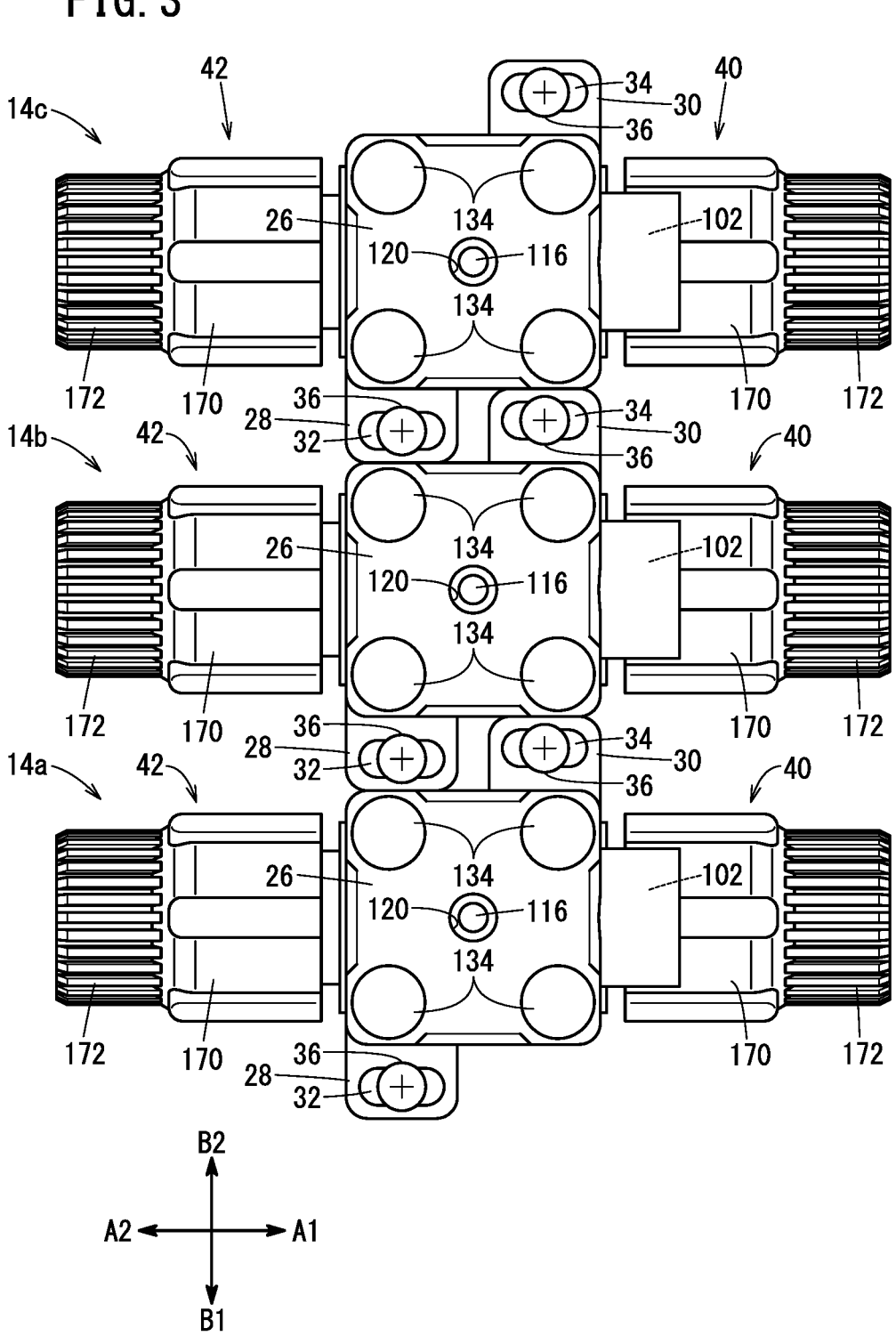
FIG. 3 is a schematic plan view of the fluid control system.

As shown in FIG. 3 that is a schematic plan view of the fluid control system 10, one side surface of the end plate 20 of the first air-operated valve 14a has a first tab 28 protruding along a B1 direction that is perpendicular to the flow direction. The first tab 28 is provided integrally with the end plate 20 in a position shifted to the A2 side. Further, the other side surface on the back of that one surface has a second tab 30 protruding along a B2 direction that is opposite to the B1 direction. The second tab 30 is provided integrally with the end plate 20 in a position shifted to the A1 side. That is, the first tab 28 and the second tab 30 protrude in the opposite directions in point-symmetrical positions of the end plate 20. The first tabs 28 and the second tabs 30 are thus arranged in a so-called zigzag fashion.

The first tab 28 and the second tab 30 respectively have a first elongated hole 32 and a second elongated hole 34 as through holes extending along their thickness direction. Threaded portions of mounting screws 36 are passed respectively through the first elongated hole 32 and the second elongated hole 34, and the threaded portions are screwed into threaded holes formed in the base 12, whereby the first air-operated valve 14a is positioned and fixed on the base 12.

A first nut 40 and a second nut 42, being the fitting nuts of the embodiment, are attached respectively to the A1-side end surface and A2-side end surface of the valve body 22, thereby forming a first fitting portion 44 and a second fitting portion 46 (both are fittings). The first fitting portion 44 and the second fitting portion 46 will be described later.

Figure 5:
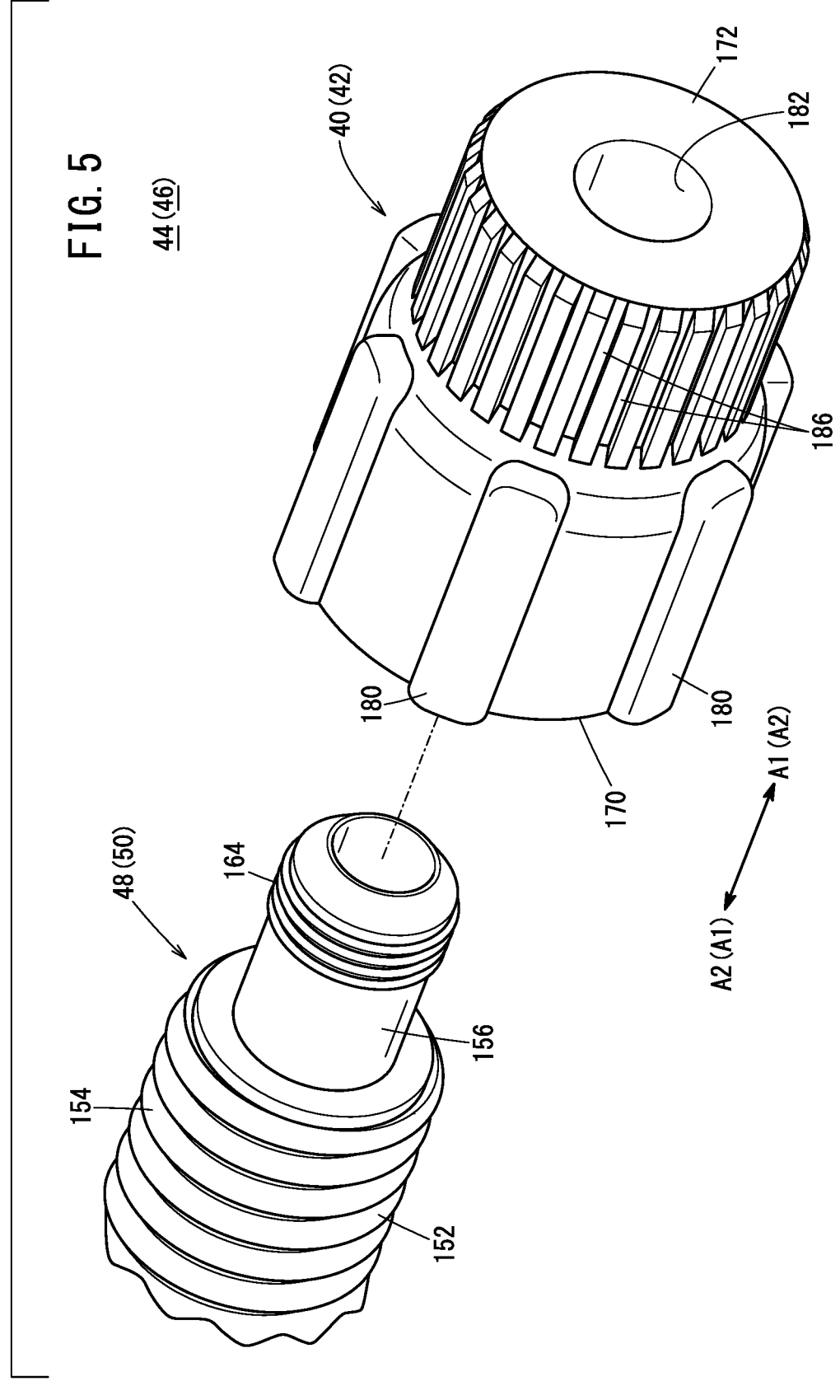
FIG. 5 is a schematic perspective view of important part in a state where a first nut has been removed from a valve body.

FIG. 4 is a schematic longitudinal cross section of the first air-operated valve 14a, and FIG. 5 is a schematic perspective view of important part illustrating a state where the first nut 40 has been removed from the valve body 22. As shown in FIGS. 4 and 5, the valve body 22 has a first joint body 48 protruding from its A1-side end surface and a second joint body 50 protruding from its A2-side end surface. The first joint body 48 extends on the A1 side and the second joint body 50 extends on the A2 side. That is, the first joint body 48 and the second joint body 50 extend along the flow direction. Needless to say, the first joint body 48 and the second joint body 50 are formed integrally with the valve body 22. In other words, the first joint body 48 and the second joint body 50 are part of the valve body 22 and therefore made of resin material.

As shown in FIG. 4, an inlet passage 52, a valve chamber 54, and an outlet passage 56 are formed in the interior of the valve body 22. The inlet passage 52 extends from the end of the first joint body 48 on the A1 side to the valve chamber 54, and is opened into the valve chamber 54. A valve seat 58 is provided in the vicinity of the opening. On the other hand, the outlet passage 56 extends from the valve chamber 54 to the end of the second joint body 50 on the A2 side. That is, the inlet passage 52 and the outlet passage 56 communicate with each other through the valve chamber 54.

In the interior of the valve body 22, a first tube wall 60 surrounding the valve seat 58 to form the valve chamber 54, and a second tube wall 62 surrounding the first tube wall 60, extend toward the first housing 24. A ring-shaped groove 64 is formed between the first tube wall 60 and the second tube wall 62. The outer edge of a diaphragm 66 is inserted in the ring-shaped groove 64. A valve portion 68 protrudes toward the valve seat 58, from a radially central area of the lower surface of the diaphragm 66. When the valve portion 68 is seated on the valve seat 58, the communication between the inlet passage 52 and the valve chamber 54 is cut off. Further, from the radially central area of the upper surface of the diaphragm 66, a substantially cylindrical engaging protrusion 70 protrudes toward the first housing 24.

The A1-side end and the A2-side end of the outer peripheral walls of the second tube wall 62 integrally connect to the outer walls of the valve body 22 that form a substantially rectangular shape.

From the lower surface of the first housing 24, which faces the valve body 22, a ring-shaped protrusion 72 protrudes in a position opposite to the first tube wall 60. The ring-shaped protrusion 72 is inserted inside the second tube wall 62 and holds the outer edge of the diaphragm 66 together with the first tube wall 60. By this, the diaphragm 66 is held by the valve body 22 and the first housing 24. On the other hand, from the upper surface of the first housing 24 that faces the second housing 26, a ring-shaped engagement portion 74 having a larger diameter than the ring-shaped protrusion 72 protrudes.

The first housing 24 is a hollow body and its inner chamber is sectioned by a partition 76 into a lower chamber 80 and an upper chamber 82. The horizontal cross sections of the lower chamber 80 and the upper chamber 82, taken along the flow direction, are substantially perfect circles, and the upper chamber 82 has a larger diameter than the lower chamber 80. The lower chamber 80 and the valve chamber 54 are divided by the diaphragm 66. In other words, the diaphragm 66 cuts off the communication between the lower chamber 80 and the valve chamber 54. A breathing port 84 communicating with the lower chamber 80 is formed in the A2-side end surface of the first housing 24. On the other hand, in the A1-side end surface of the first housing 24, a first pilot port 86 communicating with the upper chamber 82 is formed.

A first guide tube portion 88 is integrally formed with the partition 76, the lower and upper ends of the first guide tube portion 88 protruding in the lower chamber 80 and the upper chamber 82, respectively. The first guide tube portion 88 is a cylindrical portion having a first guide hole 90 extending therethrough along its axial direction.

A second guide tube portion 92 and a third tube wall 94 protrude into the first housing 24 from the inner surface of the ceiling wall of the second housing 26. A ring-shaped first recess 96 is formed between the second guide tube portion 92 and the third tube wall 94. Further, a ring-shaped second recess 98 is formed between the third tube wall 94 and the substantially rectangular outer walls of the second housing 26. Most part of a return spring 100 is accommodated in the first recess 96. On the other hand, the ring-shaped engagement portion 74 is inserted in the second recess 98. Further, a second pilot port 102 is formed in the A1-side end surface of the second housing 26. The first recess 96 and the second pilot port 102 communicate with each other through a communication passage 104 passing through the third tube wall 94.

The first housing 24 and the second housing 26 accommodate a valve rod 110 that is integrally formed with a piston portion 108. The lower end of the return spring 100 rests on the upper end surface of the piston portion 108, to thereby resiliently bias the valve rod 110 in the direction toward the valve seat 58 at all times. As will be described later, the valve rod 110 is displaced as the piston portion 108 receives pressure (pilot pressure) of the pilot fluid. Some clearance is formed between the relatively long side wall of the piston portion 108 and the inner wall of the upper chamber 82, but the clearance between the two walls is sealed by a ring-shaped seal member 126.

The valve rod 110 includes a first shaft portion 112 protruding from the lower end surface of the piston portion 108, a second shaft portion 114 protruding from the upper end surface of the piston portion 108, and a third shaft portion 116 having a smaller diameter, connected to the second shaft portion 114 and extending to the ceiling wall of the second housing 26. The first shaft portion 112 has an engaging hole 118 that is depressed toward the piston portion 108. The above-mentioned engaging protrusion 70 as part of the diaphragm 66 is fitted in the engaging hole 118.

This fitting allows the diaphragm 66 to be held by the valve rod 110 through the engaging protrusion 70.

The first shaft portion 112 is inserted in the first guide hole 90 formed in the first guide tube portion 88 that is part of the first housing 24. On the other hand, the second shaft portion 114 and the third shaft portion 116 are inserted in a second guide hole 120 formed in the second guide tube portion 92 that is part of the second housing 26. Since the second guide hole 120 is opened in the ceiling wall of the second housing 26, a worker or user who operates the fluid control system 10 can visually recognize the third shaft portion 116 in the second guide hole 120 when he or she views the first air-operated valve 14a in plan view (see FIG. 3). When the first air-operated valve 14a is in the closed state, the top surface of the third shaft portion 116 and the top surface of the ceiling wall of the second housing 26 are substantially flush with each other.

The valve rod 110 is displaced with the first shaft portion 112 being held by the first guide tube portion 88 and with the second shaft portion 114 being held by the second guide tube portion 92. In addition, the side wall of the piston portion 108 extends along the inner peripheral wall of the upper chamber 82 in a large area, and the clearance between the two walls is small. It is therefore possible to avoid the situation where the axial direction of the valve rod 110 is inclined with respect to the axial direction of the first air-operated valve 14a. Needless to say, when the valve rod 110 is displaced, the first shaft portion 112 is guided by the first guide tube portion 88 and the second shaft portion 114 is guided by the second guide tube portion 92.

As the valve rod 110 is displaced, the engaging protrusion 70 of the diaphragm 66 is pushed or pulled by the first shaft portion 112. The diaphragm 66 is therefore displaced in the same direction as the valve rod 110. With the displacement, the valve portion 68 of the diaphragm 66 is seated on or separated from the valve seat 58. That is, the inlet passage 52 and the valve chamber 54 are cut off from each other or made to communicate with each other, and the first air-operated valve 14a is brought into the closed state or the opened state.

Reference numerals 122, 124, 126, 128, 130 shown in FIG. 4 indicate ring-shaped seal members. Further, the end plate 20 has screw tightening holes (not shown) formed in its four corners, and the valve body 22, the first housing 24, and the second housing 26 have rod insertion holes (not shown) formed in their four corners. Tie rods (not shown) are inserted from the rod insertion holes of the second housing 26, and threaded portions of the tie rods are screwed into the screw tightening holes. The end plate 20, the valve body 22, the first housing 24, and the second housing 26 are thus fastened together.

Rubber caps 134 (see FIGS. 1 to 3) are press fitted in the rod insertion holes of the second housing 26. By the rubber caps 134, the rod insertion holes and the screw tightening holes are closed and kept gas-tight or liquid-tight. That is, the rubber caps 134 prevent entry of foreign matter, such as dust, liquid, etc., into the rod insertion holes and the screw tightening holes. Further, since the tie rods made of metal are sealed by the rubber caps 134, the tie rods are protected from moisture and liquid. That is, this effectively prevents corrosion of the tie rods due to adhesion of moisture or liquid. In addition, even if foreign matter like corrosion powder, metal powder, etc. generates from the tie rods, the foreign matter is sealed in the rod insertion holes by the rubber caps 134. This eliminates the fear of mixing of the foreign matter into the fluid etc.

Figure 1:
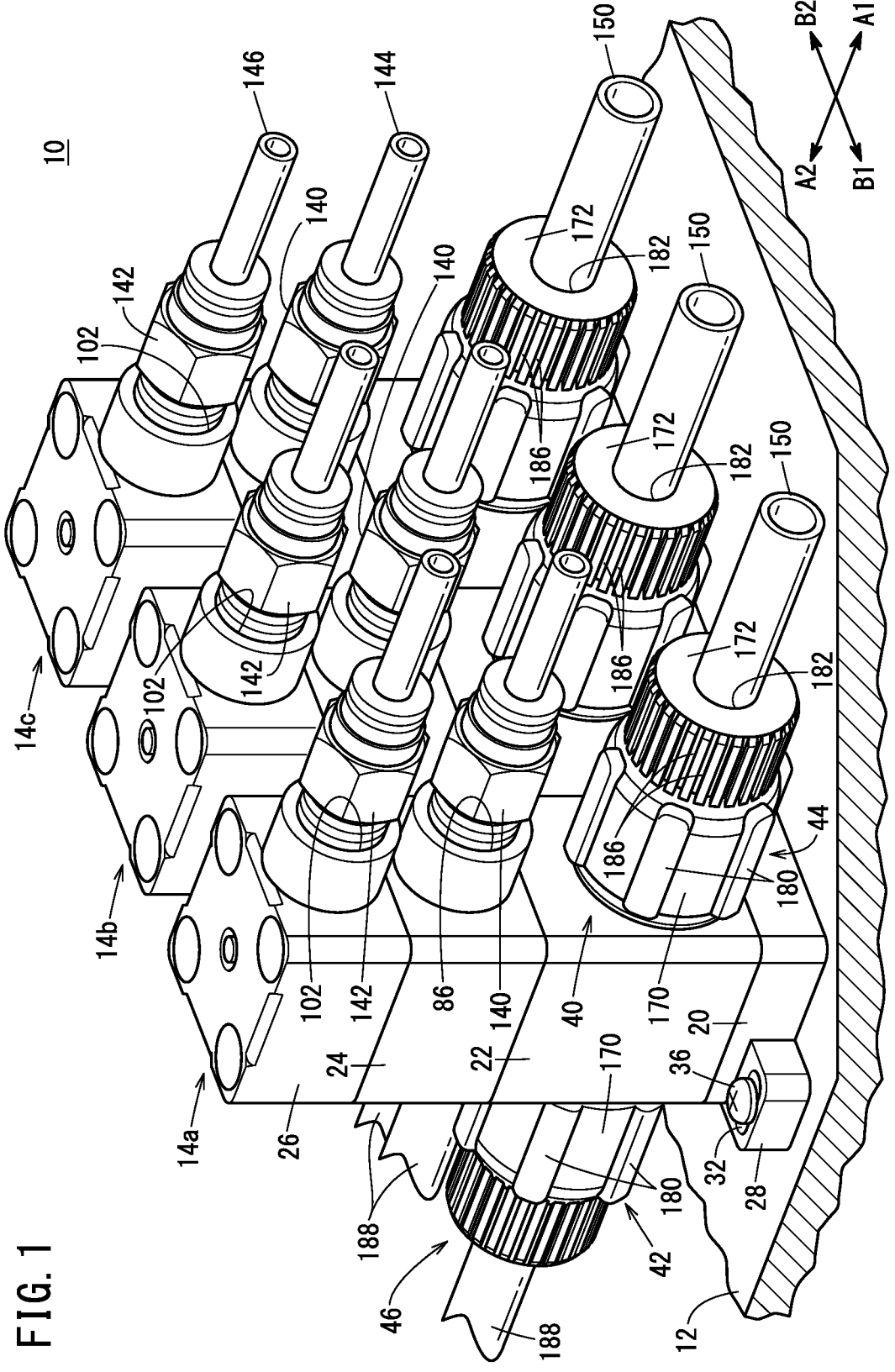
FIG. 1 is a schematic perspective view showing the entirety of a fluid control system.

As shown in FIG. 1, a first supply/discharge pipe 144 and a second supply/discharge pipe 146 (both are pilot fluid passage pipes) are connected to the first pilot port 86 and the second pilot port 102 through a first joint 140 and a second joint 142, respectively. Specifically, the first pilot port 86 and the second pilot port 102 each have a female thread formed on the inner peripheral wall thereof, and the first joint 140 and the second joint 142 each have a male thread formed on the outer peripheral wall thereof. The male thread is engaged with the female thread, whereby the first supply/discharge pipe 144 and the second supply/discharge pipe 146 are held by the first housing 24 and the second housing 26 through the first joint 140 and the second joint 142, respectively.

When the first to third air-operated valves 14a to 14c are configured as normally-closed valves as described above, it is not essential to attach the second supply/discharge pipes 146 to the second pilot ports 102. For example, the second pilot ports 102 may be closed by plug members.

Next, the first fitting portion 44 and the second fitting portion 46 provided in the valve body 22 will be described.

Figure 6:
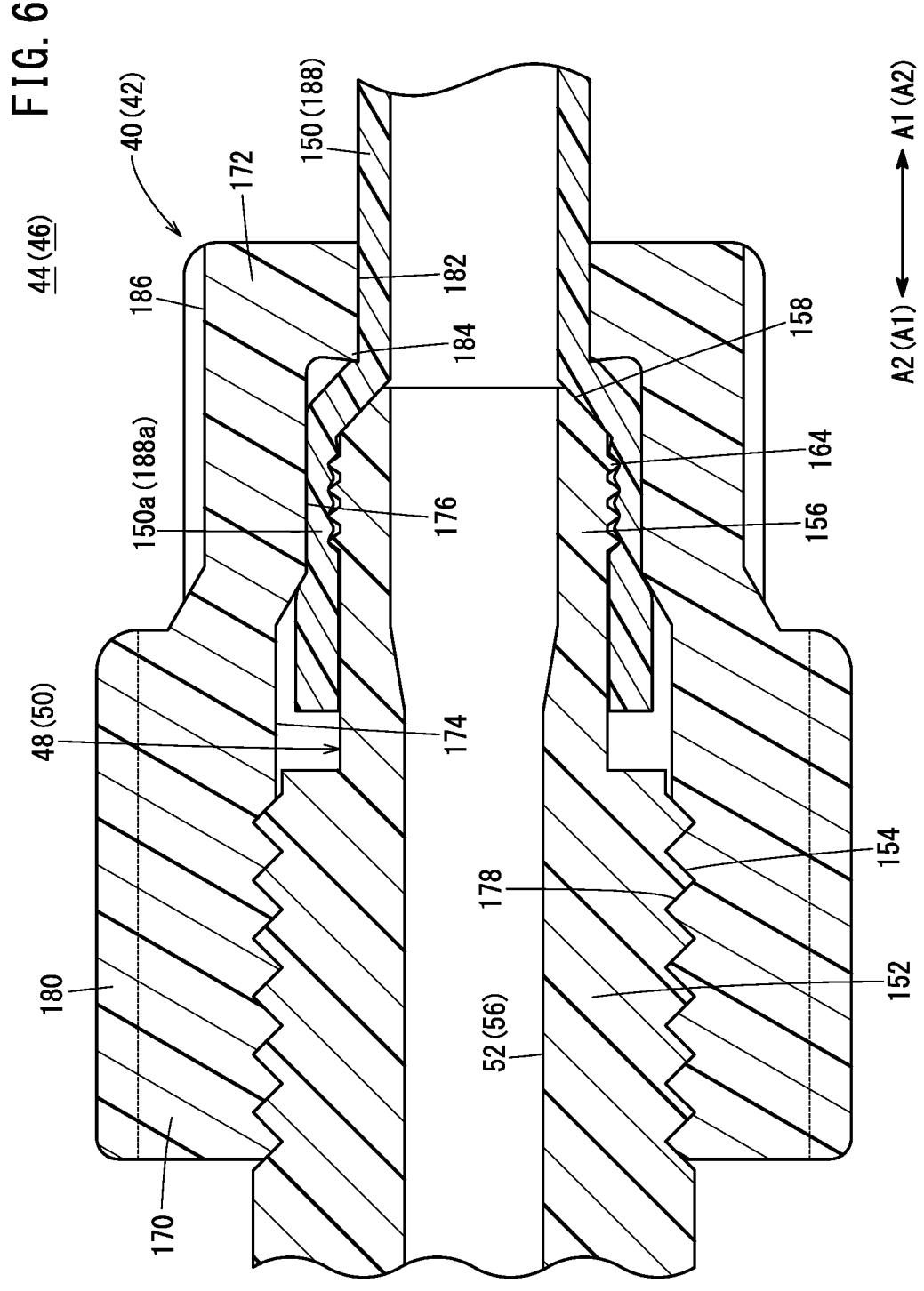
FIG. 6 is an enlarged view showing important part of FIG. 4.

As shown in FIG. 5, and FIG. 6 which is an enlarged view of important part in FIG. 4, the first fitting portion 44 includes the first joint body 48 protruding from the A1-side end surface of the valve body 22, and the first nut 40, where the first joint body 48 and the first nut 40 hold a fluid supply pipe 150 (pipe member) therebetween. Needless to say, the interior of the fluid supply pipe 150 communicates with the inlet passage 52 in the first joint body 48.

The first joint body 48 includes a cylindrical proximal portion 152 having a relatively large diameter and integrally connected to the valve body 22. A male thread 154 is formed on the outer peripheral wall of the proximal portion 152.

The first joint body 48 further includes a cylindrical extended shaft portion 156 having a relatively small diameter and protruding to the A1 side from the proximal portion 152. A tapered surface 158 whose diameter gradually expands from the A1 side toward the A2 side is formed at the end of the extended shaft portion 156.

On the outer peripheral surface of the extended shaft portion 156, a plurality of ring-shaped protrusions 164 are formed in an area on the A2 side of the tapered surface 158, the ring-shaped protrusions 164 abutting on the inner wall surface of a diameter-increased portion 150a of the fluid supply pipe 150. The plurality of ring-shaped protrusions 164 each have a top having a substantially triangular cross section, and are arranged at certain intervals along the axial direction of the extended shaft portion 156. The ring-shaped protrusions 164 have substantially the same height. FIGS. 5 and 6 show an example in which five ring-shaped protrusions 164 are provided, but the number of the ring-shaped protrusions 164 is not particularly limited to this. Only a single ring-shaped protrusion 164 may be provided, for example.

On the other hand, the first nut 40 includes a large-diameter tube portion 170 having a relatively large diameter, and a small-diameter tube portion 172 that is contiguous to the large-diameter tube portion 170 and that protrudes to the A1 side. Needless to say, the small-diameter tube portion 172 has a smaller diameter than the large-diameter tube portion 170. The large-diameter tube portion 170 and the small-diameter tube portion 172 are both formed as hollow tubes. Accordingly, the large-diameter tube portion 170 has a first inner hole 174 therein and the small-diameter tube portion 172 has a second inner hole 176 therein. The inner diameter of the first inner hole 174 is set larger than that of the second inner hole 176.

Then, the inner peripheral wall forming the first inner hole 174 of the large-diameter portion 170 has formed thereon a female thread 178 that engages with the male thread 154 of the first joint body 48. The outer peripheral wall of the large-diameter tube portion 170 has formed thereon a plurality of engagement protrusions 180 protruding outward in the diameter direction of the large-diameter tube portion 170 (see FIGS. 1 to 3). Accordingly, the maximum outer diameter portion of the first nut 40, where its outer diameter defined as the distance from the center to the outer circumference is maximum, is the area where each of the engagement protrusions 180 is formed. Each engagement protrusion 180 extends along a direction orthogonal to the diameter direction, i.e., along the longitudinal direction (flow direction) of the large-diameter tube portion 170. In this case, six engagement protrusions 180 are provided and spaced apart from each other at substantially equal intervals.

An insertion hole 182 having a circular cross section is formed in the A1-side end surface (end surface) of the small-diameter tube portion 172, and the fluid supply pipe 150 is inserted in the insertion hole 182. Further, a ring-shaped pressing portion 184, which forms an acute angle in cross section, is formed on the inner peripheral wall of the small-diameter tube portion 172. When the first nut 40 is tightened on the first joint body 48, the ring-shaped pressing portion 184 presses the inclined outer peripheral surface of the fluid supply pipe 150 against the tapered surface 158.

The second inner hole 176 has a larger diameter than the insertion hole 182. The inner peripheral wall forming the second inner hole 176 is spaced apart at a certain interval from the ring-shaped protrusions 164 on the extended shaft portion 156 of the first joint body 48. The distance between the tops of the ring-shaped protrusions 164 and the inner peripheral wall is smaller than the thickness of the diameter-increased portion 150a of the fluid supply pipe 150 at the time of the formation of the diameter-increased portion 150a.

On the outer peripheral wall of the small-diameter tube portion 172, a plurality of ridges protrude outward in the diameter direction of the small-diameter tube portion 172. The number of the ridges is larger than the number of the engagement protrusions 180 on the outer peripheral wall of the large-diameter tube portion 170. Each ridge extends along the longitudinal direction (flow direction) that is orthogonal to the diameter direction of the small-diameter tube portion 172. Accordingly, engagement grooves 186, which are depressed inwardly in the diameter direction of the small-diameter tube portion 172 and extend along the longitudinal direction orthogonal to the diameter direction, are formed between adjacent ridges. The ridges and the engagement grooves 186 alternate along the circumferential direction of the small-diameter tube portion 172, so that the outer peripheral wall of the small-diameter tube portion 172 is formed like so-called straight teeth.

The first nut 40 constructed as described above is made of a resin material like the valve body 22 (joint body). In the same way, the fluid supply pipe 150 is also made of a resin material. Preferred examples of the resin materials include fluorine compound resins listed earlier.

The second fitting portion 46 disposed in the A2-side end surface of the valve body 22 includes the second joint body 50, the second nut 42, and a fluid discharge pipe 188 that are configured in the same manner respectively as the first joint body 48, the first nut 40, and the fluid supply pipe 150. The second fitting portion 46 will therefore be not described in detail. Concerning the second joint body 50 and the second nut 42, "A1" in the description of the first joint body 48 and the first nut 40 is replaced by "A2". The diameter-increased portion of the fluid discharge pipe 188 is labeled with reference numeral 188*a* (see FIG. 6).

The remaining second and third air-operated valves 14*b* and 14*c* are constructed in the same manner as the first air-operated valve 14*a*. Accordingly, the same constituent components are labeled with the same reference numerals and will not be described in detail.

Figure 7:
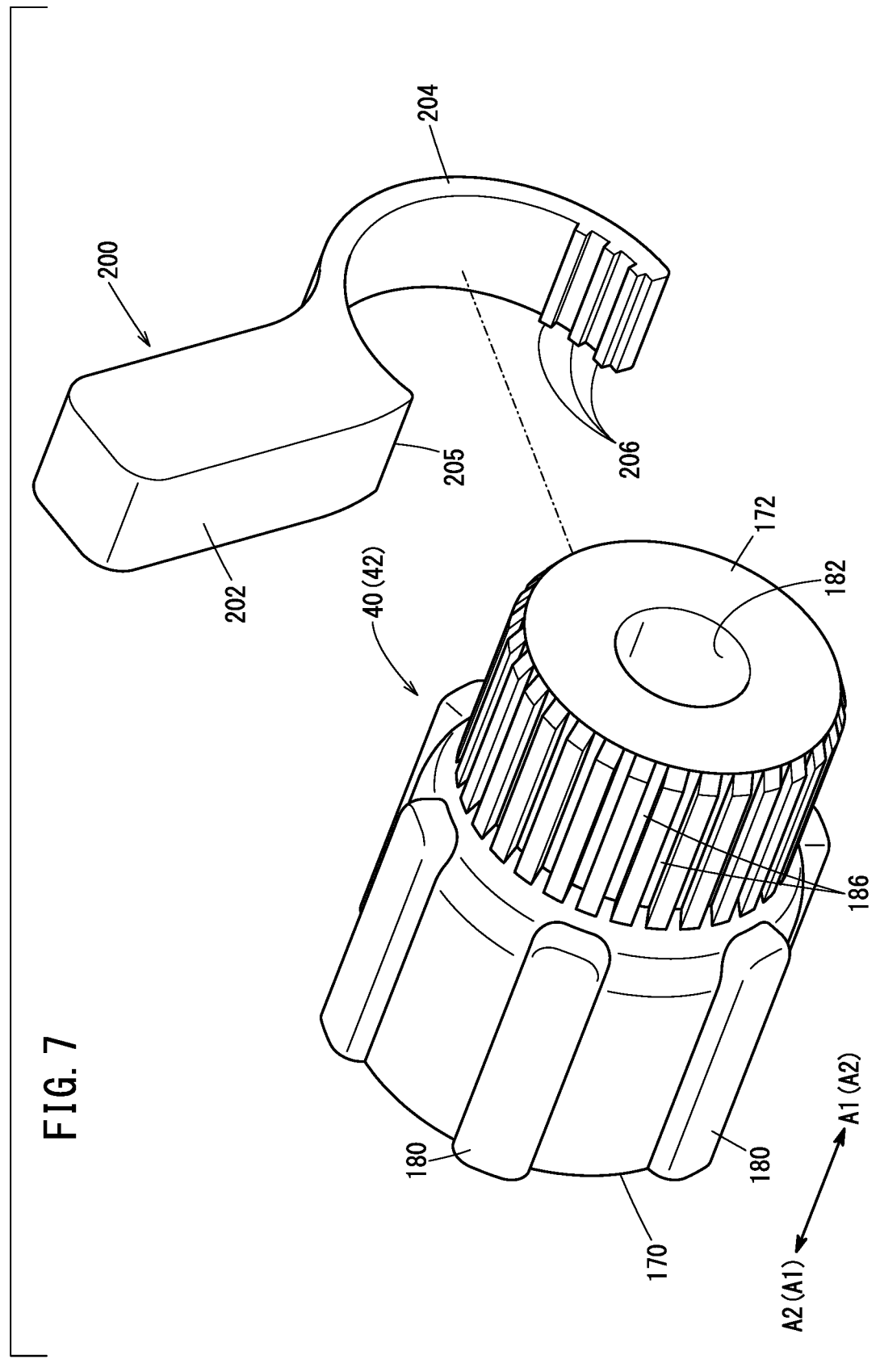
FIG. 7 is a schematic perspective view of important part illustrating a nut turning tool (first tool), in a state where its arc-shaped attachment portion (small semicircular ring) for applying torque to a small-diameter tube portion is to be fitted around the small-diameter tube portion.

FIG. 7 shows a first tool 200, which is a nut turning tool according to the embodiment, and applies torque to the small-diameter tube portion 172 to turn the first nut 40 (or the second nut 42). The first tool 200 includes a small handle 202 as a shaft, and a small semicircular ring 204 (arc-shaped attachment portion) which is formed of an arc-shaped, thin, curved plate and has a substantially semicircular form. The small handle 202 has larger rigidity than the small semicircular ring 204.

The small semicircular ring 204 has a shape such that a ring body is cut into a substantially semicircular shape, i.e., an arc-like shape. An opening 205 is therefore formed in the small semicircular ring 204. Further, the small semicircular ring 204, formed of a thin curved plate, has superior elasticity. That is, when an external force acts on the opening 205 and the opening 205 is expanded, the opening 205 easily closes when the external force disappears. That is, the small semicircular ring 204 returns to its original shape.

Further, the inner wall of the small semicircular ring 204 has formed thereon three engagement claws 206 (claws) protruding inwardly in the diameter direction, i.e., toward the first nut 40 (or the second nut 42). The inner diameter of the small semicircular ring 204 substantially matches the outer diameter of the small-diameter tube portion 172 of the first nut 40 and the second nut 42. The pitch or phase difference between adjacent engagement claws 206 is substantially equal to the pitch or phase difference between adjacent engagement grooves 186. The three engagement claws 206 can thus engage with three engagement grooves 186.

FIG. 7 shows an example in which three engagement claws 206 are provided, but the number of the engagement claws 206 is not particularly limited to this, so long as it is one or more. That is, two or less engagement claws 206, or four or more engagement claws 206 may be provided.

Figure 8:
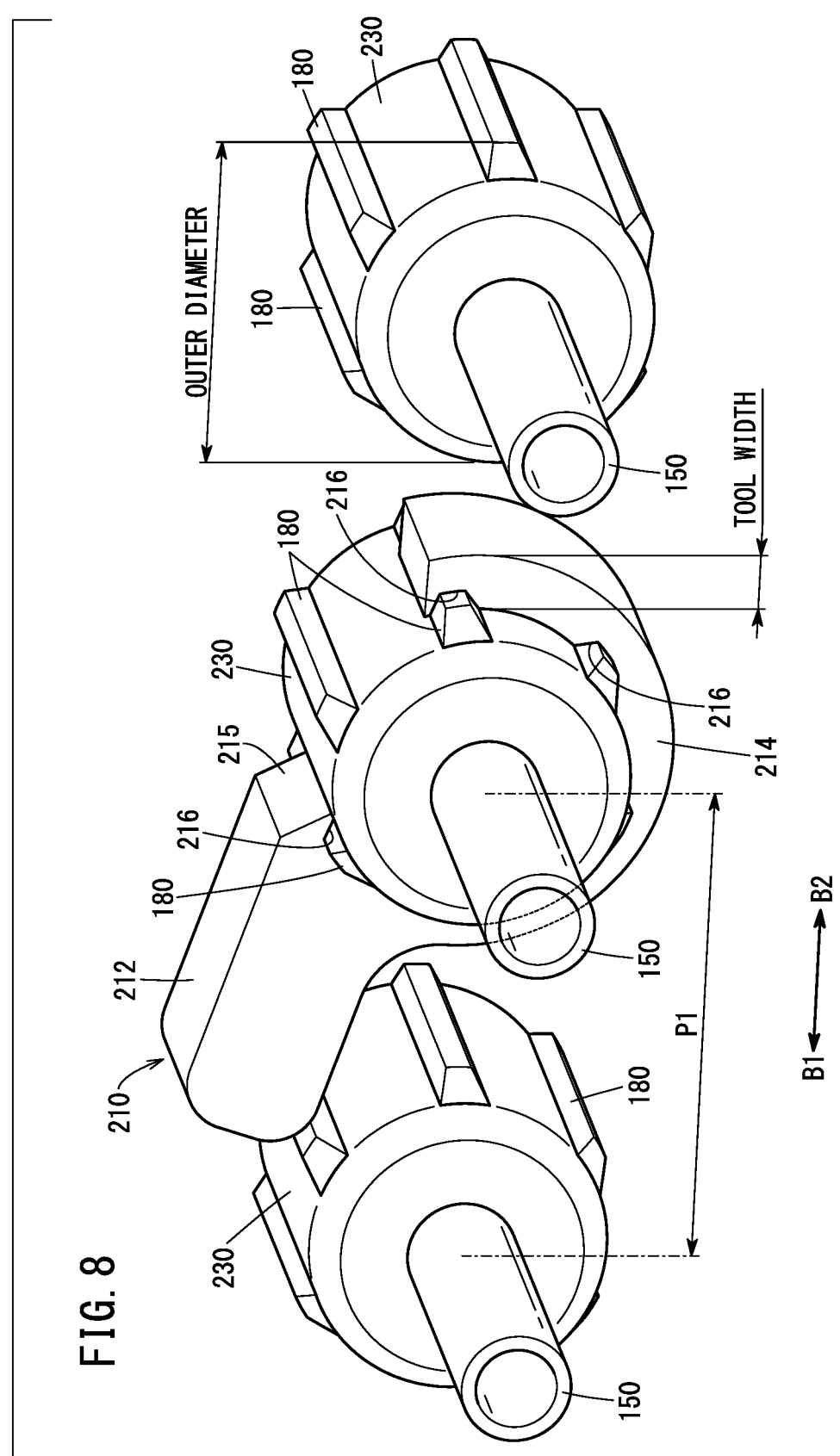
FIG. 8 is a schematic perspective view of important part, in a state where a second tool is being used to tighten (retighten or make tighter) a fitting nut of a conventional technique whose outer diameter is substantially constant along its longitudinal direction.

FIG. 8 shows a second tool 210 that can apply torque to the large-diameter tube portion 170. The second tool 210 includes a large handle 212 that is thicker and longer than the small handle 202, and a large semicircular ring 214 whose inner diameter is larger than that of the small semicircular ring 204 and that is somewhat longer than the semicircle. The large semicircular ring 214 has an opening 215, and includes five engagement recesses 216 formed in its inner wall and depressed outward in its diameter direction. The inner diameter of the large semicircular ring 214 substantially matches the outer diameter of the large-diameter tube portions 170 of the first nut 40 and the second nut 42. The pitch or phase difference between adjacent engagement recesses 216 is substantially equal to the pitch or phase difference between adjacent engagement protrusions 180. Accordingly, the five engagement recesses 216 can engage with five engagement protrusions 180.

While FIG. 8 shows an example in which the number of the engagement protrusions 180 is six (the phase difference between the engagement protrusions 180 is about 60°) and the number of the engagement recesses 216 is five, the numbers of the engagement protrusions 180 and the engagement recesses 216 are not particularly limited to this example. For instance, even if six engagement protrusions

180 are provided as in this example, four or less engagement recesses 216 may be provided. Further, five or less, or six or more engagement protrusions 180 may be provided, with four or less, or six or more engagement recesses 216.

The first tool 200 and the second tool 210 are both made of resin material. Examples of the resin material include fluorine compound resins, such as polytetrafluoroethylene, polyvinylidene fluoride, perfluoroalkoxy alkane, etc., but may be other resin material. Specific examples of other resin material include polypropylene, polyethylene, etc.

According to the embodiment, the first nut 40 and the second nut 42 (fitting nuts), the first fitting portion 44 and the second fitting portion 46, the first to third air-operated valves 14*a* to 14*c* (fluid pressure devices), the fluid control system 10 including the same, and the first tool 200, are constructed basically as described so far. Next, their functions and effects will be described in connection with a method for turning the fitting nuts (the first nut 40 and the second nut 42) that is performed in the process of assembling the fluid control system 10.

In order to fabricate the fluid control system 10, first, the first to third air-operated valves 14*a* to 14*c* are positioned and fixed on the base 12. For this purpose, the threaded portions of the mounting screws 36 are inserted respectively in the first elongated holes 32 of the first tabs 28 and the second elongated holes 34 of the second tabs 30 of the first to third air-operated valves 14*a* to 14*c*, and the threaded portions are temporarily screwed respectively into the threaded holes formed in the base 12. At this stage, the first to third air-operated valves 14*a* to 14*c* can be displaced along the longitudinal direction of the first elongated holes 32 and the second elongated holes 34. That is, the positions of the first to third air-operated valves 14*a* to 14*c* can be adjusted. After that, the mounting screws 36 are retightened (made tighter).

Since the first tabs 28 and the second tabs 30 are arranged in a zigzag fashion (see FIG. 3), the second tab 30 of the first air-operated valve 14*a* and the first tab 28 of the second air-operated valve 14*b*, for example, are arranged in a row on the upstream side (A1 side) and the downstream side (A2 side) of the flow direction. That is, the second tab 30 of the first air-operated valve 14*a* is not arranged in a row along the B1 direction or B2 direction with the first tab 28 or the second tab 30 of the second air-operated valve 14*b*. Accordingly, it is possible to set the distance between the valve bodies 22 of the first and second air-operated valves 14*a* and 14*b* to be substantially equal to the protruding length of the second tab 30 of the first air-operated valve 14*a* in the B2 direction (or the protruding length of the first tab 28 of the second air-operated valve 14*b* in the B1 direction).

Consequently, the first air-operated valve 14*a* and the second air-operated valve 14*b* can be located most closely. The same applies to the second air-operated valve 14*b* and the third air-operated valve 14*c*. The fluid control system 10 can be made compact for this reason.

In FIG. 3, the side of the first to third air-operated valves 14*a* to 14*c* on which the first pilot ports 86 and the second pilot ports 102 are located is the fluid inlet side, and the other side is the fluid outlet side, but this is merely an example. A configuration may be adopted in which, in at least one of the first to third air-operated valves 14*a* to 14*c*, the side on which the first pilot port 86 and the second pilot port 102 are located is the fluid outlet side and the other side is the fluid inlet side.

Next, the first supply/discharge pipe 144 is connected into the first pilot port 86 through the first joint 140, and the second supply/discharge pipe 146 is connected into the second pilot port 102 through the second joint 142. The first supply/discharge pipe 144 and the second supply/discharge pipe 146 may be connected respectively into the first pilot port 86 and the second pilot port 102 before positioning and fixing the first to third air-operated valves 14a to 14c on the base 12.

Next, the first fitting portion 44 is assembled. Specifically, first, the end of the fluid supply pipe 150 is inserted into the insertion hole 182 of the first nut 40, and the end of the fluid supply pipe 150 is pulled by a given length to the large-diameter tube portion 170 side. Then, the first joint body 48 is inserted into the hollow interior of the end.

The extended shaft portion 156 of the first joint body 48 is inserted into the large-diameter tube portion 170 of the first nut 40, and the female thread 178 of the first nut 40 is screwed along the male thread 154 of the first joint body 48. That is, the first nut 40 is tightened. The first nut 40 may be first manually tightened by the worker and then retightened after that, for example.

As the first nut 40 is tightened, the diameter of the fluid supply pipe 150 is expanded gradually from the end along the tapered surface 158 of the extended shaft portion 156. Also, the inner peripheral wall of the small-diameter tube portion 172 of the first nut 40 and the extended shaft portion 156 of the first joint body 48 gradually overlap along the axial direction. As a result, the plurality of ring-shaped protrusions 164 on the extended shaft portion 156 gradually face the inner peripheral wall forming the second inner hole 176 of the small-diameter tube portion 172, starting from the side close to the tapered surface 158. The inner peripheral wall facing the ring-shaped protrusions 164 presses the outer wall surface of the expanded fluid supply pipe 150 against the ring-shaped protrusions 164.

That is, the fluid supply pipe 150 is first expanded by the extended shaft portion 156 and then deformed while being squeezed sequentially from the side close to the tapered surface 158. In this way, the inner peripheral wall of the diameter-increased portion 150a is compressed in the areas thereof in contact with the ring-shaped protrusions 164, while being swelled inwardly in the diameter direction on both sides thereof and entering the spaces between adjacent ring-shaped protrusions 164.

The diameter-increased portion 150a of the fluid supply pipe 150 is formed in this way, and the diameter-increased portion 150a is thus held between the plurality of ring-shaped protrusions 164 of the extended shaft portion 156 and the inner peripheral wall of the small-diameter tube portion 172 of the first nut 40. That is, the inner peripheral wall of the diameter-increased portion 150a comes in close contact with the plurality of ring-shaped protrusions 164. A seal is thus provided between the ends of the ring-shaped protrusions 164 and the inner wall surface of the diameter-increased portion 150a.

Then, as the first nut 40 is further screwed by manual tightening or retightening, the fluid supply pipe 150 is pinched and pressed between the tapered surface 158 of the extended shaft portion 156 and the ring-shaped pressing portion 184 of the first nut 40. As a result, the tapered surface 158 comes in close contact with the inclined inner wall surface of the fluid supply pipe 150 that is pressed by the inner peripheral wall of the small-diameter tube portion 172. A seal is thus provided also between the tapered surface 158 and the inclined inner wall surface of the fluid supply pipe 150.

Figure 9:
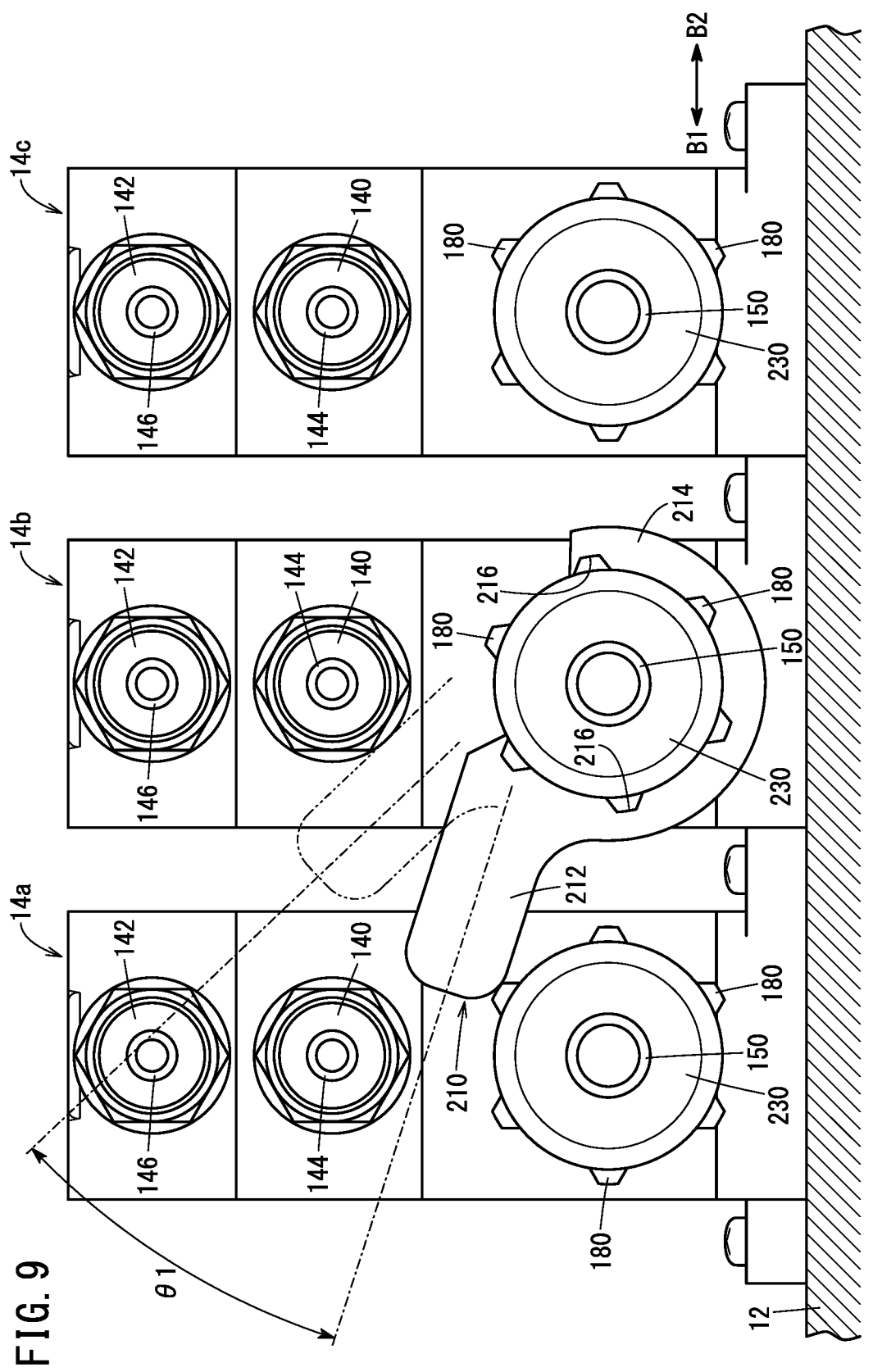
FIG. 9 is a schematic front view of important part illustrating the state of FIG. 8.

Now, FIGS. 8 and 9 show fitting nuts 230 according to a conventional technique, one of which is being retightened. In order to facilitate visual recognition and understanding, FIG. 8 omits the valve bodies 22, first housings 24, etc., and the engagement protrusions 180 are labeled with the same reference numeral as the engagement protrusions 180 of the first nut 40. Also, the outer diameter of the fitting nuts 230 is the same as the outer diameter of the large-diameter tube portion 170 of the first nut 40 and substantially constant along the longitudinal direction of the fitting nut 230.

As explained earlier, the first to third air-operated valves 14a to 14c are arranged in a row. Accordingly, the fitting nuts 230 of the first to third air-operated valves 14a to 14c are arranged in a row from the B1 side to the B2 side.

FIGS. 8 and 9 show an example in which the fitting nut 230 of the second air-operated valve 14b is retightened by the second tool 210. In this case, as can be seen also referring to FIG. 17, engaging the engagement recesses 216 of the second tool 210 with the engagement protrusions 180 and turning the fitting nut 230 requires that a pitch P1 between the adjacent fitting nuts 230 be set not less than the sum of the tool width and the outer diameter of the maximum outer diameter portion of the fitting nut 230 (the distance from the center of the fitting nut 230 to the outer circumferential surfaces of the engagement protrusions 180). This is because, if the pitch P1 is less than the sum, the fitting nuts 230 interfere with the large semicircular ring 214 as the second tool 210 is moved along the longitudinal direction of the fitting nuts 230.

Hence, the first air-operated valve 14a and the second air-operated valve 14b, and the second air-operated valve 14b and the third air-operated valve 14c, cannot be located so close that the pitch P1 becomes less than the sum of the outer diameter of the maximum outer diameter portion of the fitting nut 230 and the tool width. That is, in this case, it is difficult to locate the first to third air-operated valves 14a to 14c most closely as explained earlier.

Furthermore, as shown in FIG. 9, when the fitting nut 230 is turned, the first joint 140 and the first supply/discharge pipe 144 interfere with the large handle 212 of the second tool 210 while a turning angle Θ1 is relatively small. In this case, the large semicircular ring 214 is once removed from the fitting nut 230, the large handle 212 is returned to the position before being turned, and the engagement recesses 216 is engaged with the engagement protrusions 180 again to turn the fitting nut 230 again. However, the retightening work will be troublesome if this work has to be repeated many times.

Furthermore, if the turning angle Θ1 is less than the phase difference between adjacent engagement protrusions 180 (60° in the example in which the six engagement protrusions 180 are provided), then the fitting nut 230 of the first air-operated valve 14a may interfere with the large handle 212 when engaging the engagement recesses 216 with the engagement protrusions 180 again. In this case, engaging the engagement recesses 216 with the engagement protrusions 180 again itself is difficult.

Figure 10:
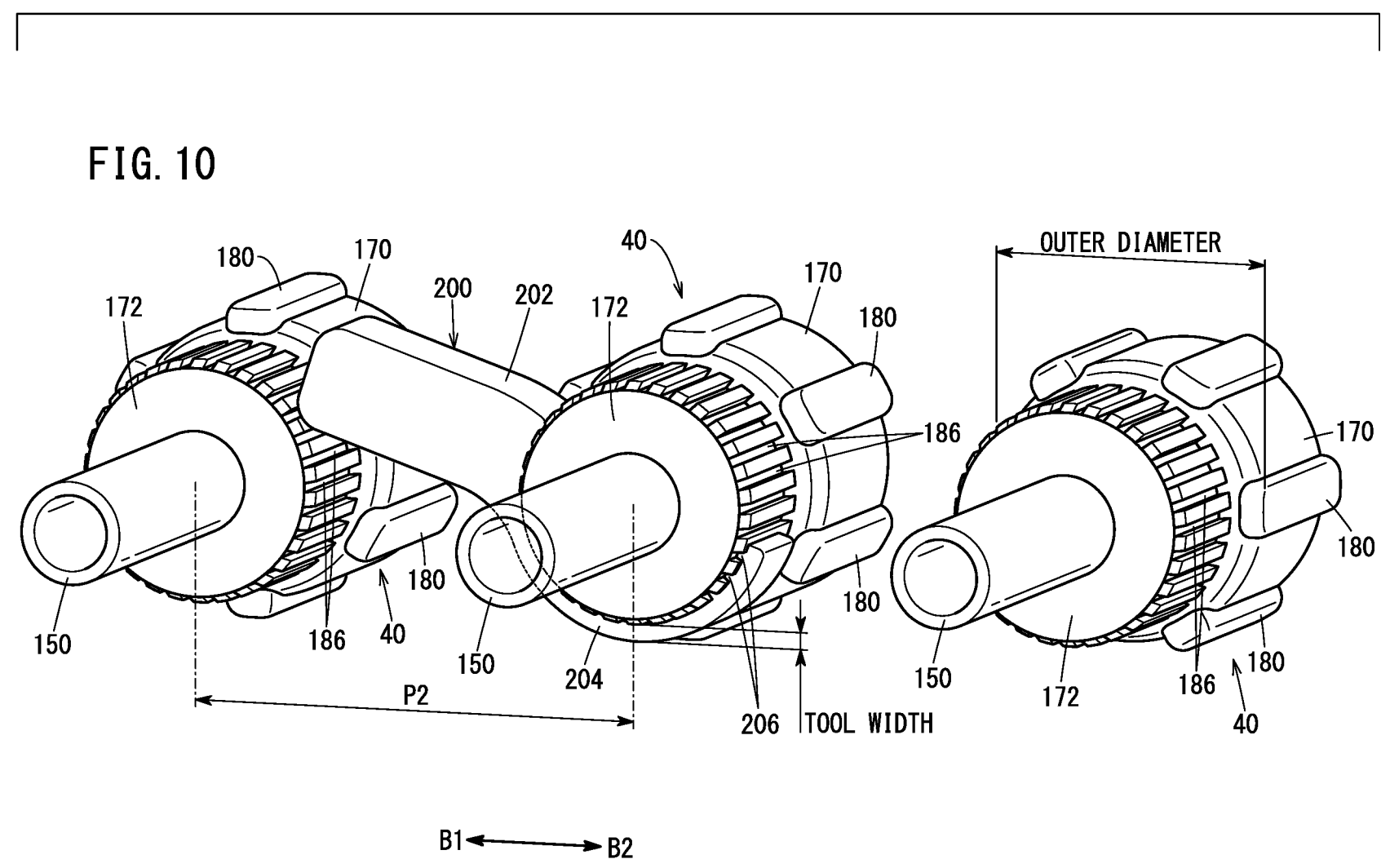
Figure 11:
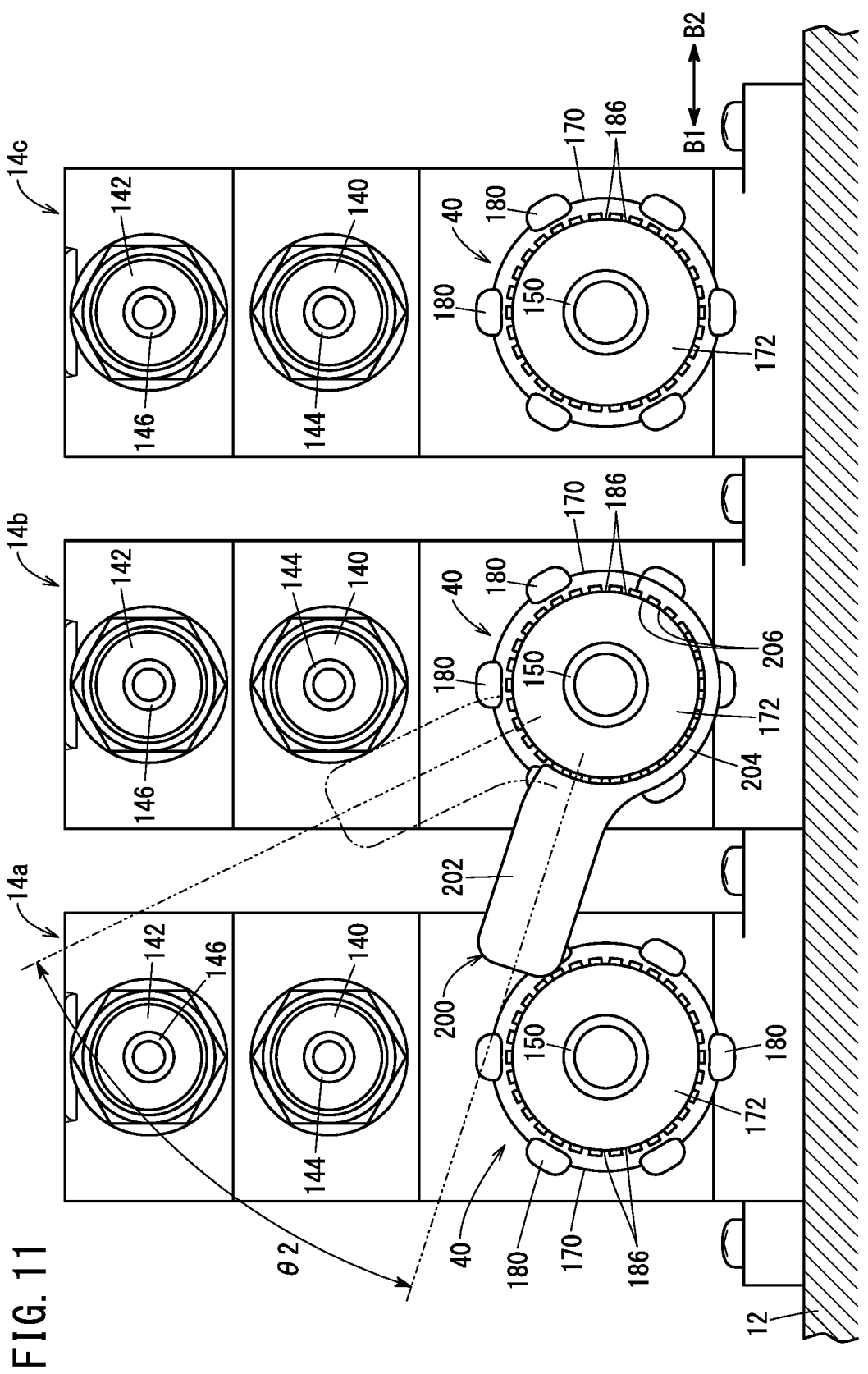
FIG. 11 is a schematic front view of important part showing the state of FIG. 10.

In contrast, in the embodiment, as shown in FIGS. 10 and 11, since the small-diameter tube portions 172 are smaller in diameter than the large-diameter tube portions 170, relatively large clearance is formed between adjacent small-diameter tube portions 172 even when the large-diameter tube portions 170 of the first nuts 40 are located most closely. When the worker retightens the first nut 40 of the second air-operated valve 14b, the worker inserts the small semicircular ring 204 of the first tool 200 into the clearance and then causes the small-diameter tube portion 172 to enter the opening 205 of the small semicircular ring 204. Since the small semicircular ring 204 has superior elasticity, the opening 205 of the small semicircular ring 204 is easily expanded. It is thus easy to cause the small-diameter tube portion 172 to enter the opening 205.

At substantially the same time as the small-diameter tube portion 172 enters the opening 205, the expanded opening 205 closes due to the elasticity of the small semicircular ring 204. At substantially the same time or before that, the three engagement claws 206 formed on the inner wall of the small semicircular ring 204 are engaged respectively with three of the engagement grooves 186. The first tool 200 is thus attached to (fitted around) the small-diameter tube portion 172 without coming off from the small-diameter tube portion 172. In this state, the worker turns the small handle 202 to apply torque to the small-diameter tube portion 172, to thereby integrally turn the small-diameter tube portion 172 and the large-diameter tube portion 170 that is continuous to the small-diameter tube portion 172. Since the rigidity of the small handle 202 is larger than that of the small semicircular ring 204, the torque is efficiently transmitted from the small handle 202 to the small-diameter tube portion 172.

Figure 16:
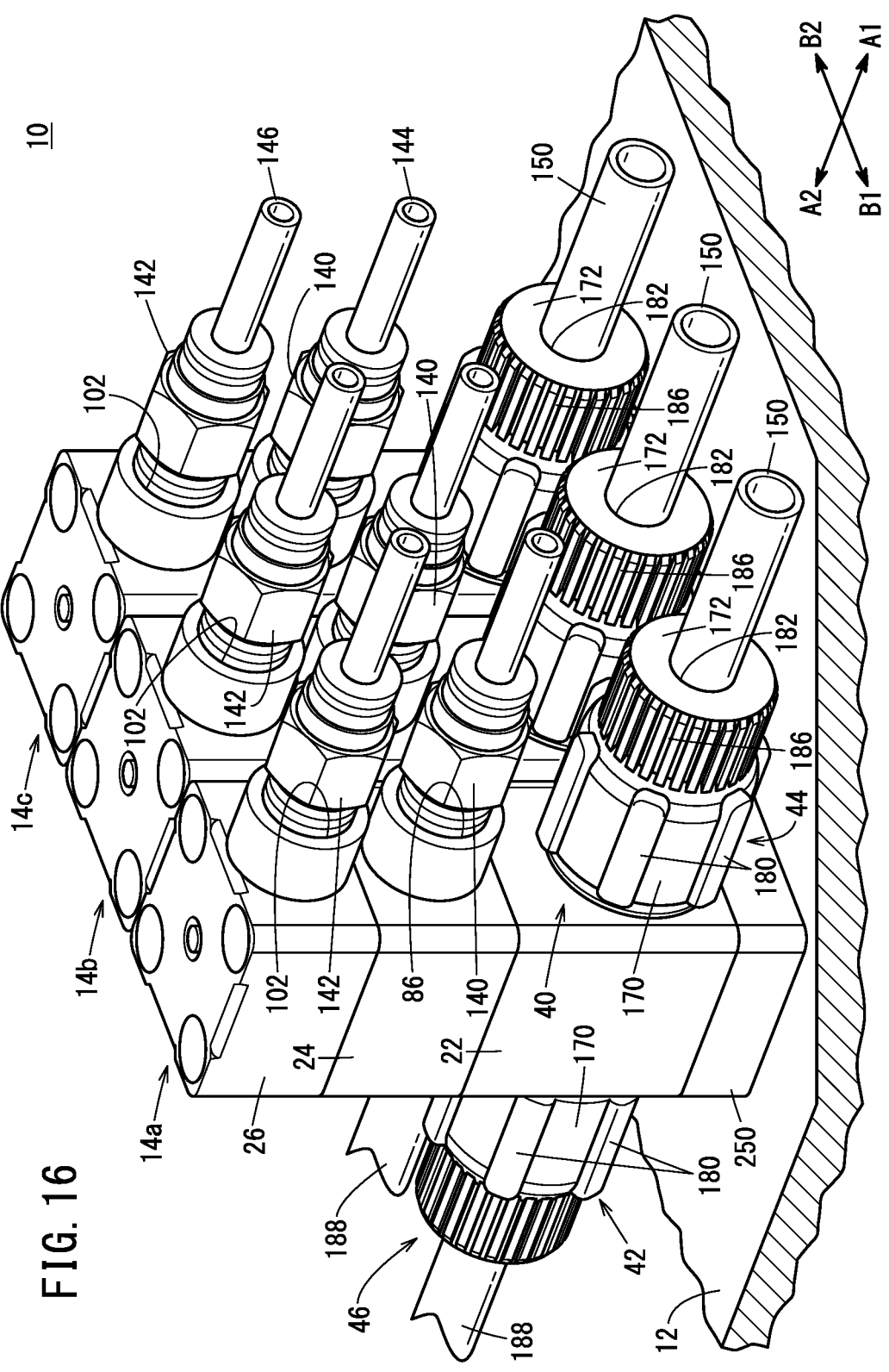
FIG. 16 is a schematic perspective view illustrating the entirety of a fluid control system including positioning and fixing members (end plates) having no tabs.
Figure 18:
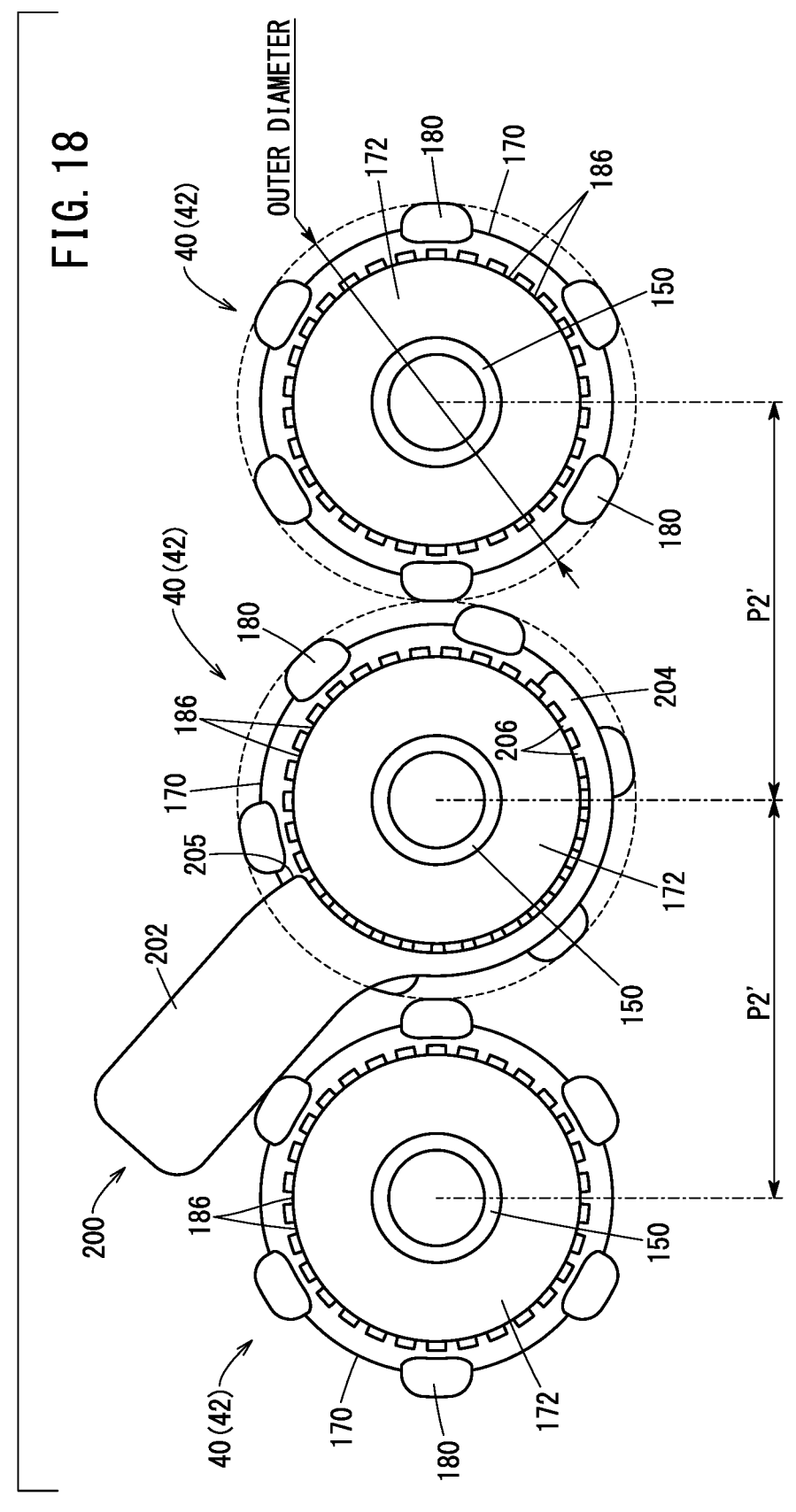
FIG. 18 is a front view of important part, in a state where, in the structure shown in FIG. 16, the first nuts are used and the first nut in the center is being turned by the first tool.

In this way, according to the embodiment in which the first nut 40 has the small-diameter tube portion 172, the first nut 40 can be turned even when the large-diameter tube portions 170 are located most closely. That is, depending on the circumstances, particularly as shown in FIGS. 16 and 18, a pitch P2 between adjacent first nuts 40 can be set substantially equal to the outer diameter of the maximum outer diameter portion of the first nut 40 (twice the distance from the center of the large-diameter tube portion 170 to the outer surfaces of the engagement protrusions 180). Consequently, the first to third air-operated valves 14a to 14c can be arranged in a row most closely as has been explained above.

Furthermore, as shown in FIG. 11, because the outer diameter of the small-diameter tube portion 172 is smaller than that of the large-diameter tube portion 170, the turning angle Θ2, from the position at which turning of the small-diameter tube portion 172 of the first nut 40 is started to the position at which the first joint 140 and the first supply/discharge pipe 144 interfere with the small handle 202 of the first tool 200, is larger than the turning angle Θ1. Thus, the first nut 40 can be turned through a larger angle by applying torque to the small-diameter tube portion 172 one time. When the first joint 140 and the first supply/discharge pipe 144 interfere with the small handle 202, the small semicircular ring 204 is once removed from the small-diameter tube portion 172, the small handle 202 is returned to the position before being turned, and the engagement claws 206 are engaged with the engagement grooves 186 again, to turn the first nut 40 again. Thus, because the turning angle Θ2 in one turning of the first nut 40 can be made larger, the first nut 40 can be tightened by turning it a reduced number of times.

Furthermore, because the pitch or phase difference between adjacent engagement grooves 186 is smaller, it is possible to effectively avoid the situation where the first nut 40 of the first air-operated valve 14a interferes with the small handle 202 during re-engagement of the engagement claws 206 with the engagement grooves 186. The engagement claws 206 can thus be re-engaged with the engagement grooves 186 easily. For these reasons, the work of retightening can be easily achieved even if the turning angle Θ2 is small.

The second fitting portion 46 can be assembled by tightening the second nut 42 around the second joint body 50 in the same manner. Since the first pilot port 86 and the second pilot port 102 are not provided on the side of the second fitting portion 46 (on the A2 side), there is no fear that the first tool 200 or the second tool 210 is interfered with by the first joint 140, the first supply/discharge pipe 144, etc., whichever of the first tool 200 and the second tool 210 is used. In such a case, the second nut 42 may be turned by using the second tool 210.

Specifically, the five engagement recesses 216 formed in the inner wall of the large semicircular ring 214 of the second tool 210 are engaged with five of the engagement protrusions 180 formed on the outer peripheral wall of the large-diameter tube portion 170 of the second nut 42 in the same manner as shown in FIG. 8. Torque is then applied to the large-diameter tube portion 170 through the large handle 212. The large-diameter tube portion 170 and the small-diameter tube portion 172 that is continuous to the large-diameter tube portion 170 are thus turned integrally.

In this way, because of the formation of the engagement protrusions 180 on the outer peripheral walls of the large-diameter tube portions 170 of the first nut 40 and the second nut 42, the first nut 40 and the second nut 42 can not only be turned through the application of torque to the small-diameter tube portion 172 by means of the first tool 200, but can also be turned through the application of torque to the large-diameter tube portion 170 by means of the second tool 210. In the latter case, larger torque can be applied compared to when the small-diameter tube portion 172 is turned. This provides the advantage that the retightening work of the first nuts 40 and the second nuts 42 can be achieved easily in situations where the pipe members or the like are not provided densely and the second tool 210 can be easily turned.

That is, the formation of the engagement grooves 186 around the small-diameter tube portion 172 and the engagement protrusions 180 around the large-diameter tube portion 170 enables selective use of the first tool 200 and the second tool 210. Hence, when supply/discharge pipes etc. interfere with the second tool 210, then the first tool 200 can be used to reliably turn the small-diameter tube portion 172 even in a small space, while the second tool 210 can be used to apply larger torque to the large-diameter tube portion 170 when there is no fear that supply/discharge pipes etc. interfere with the second tool 210.

Figure 12:
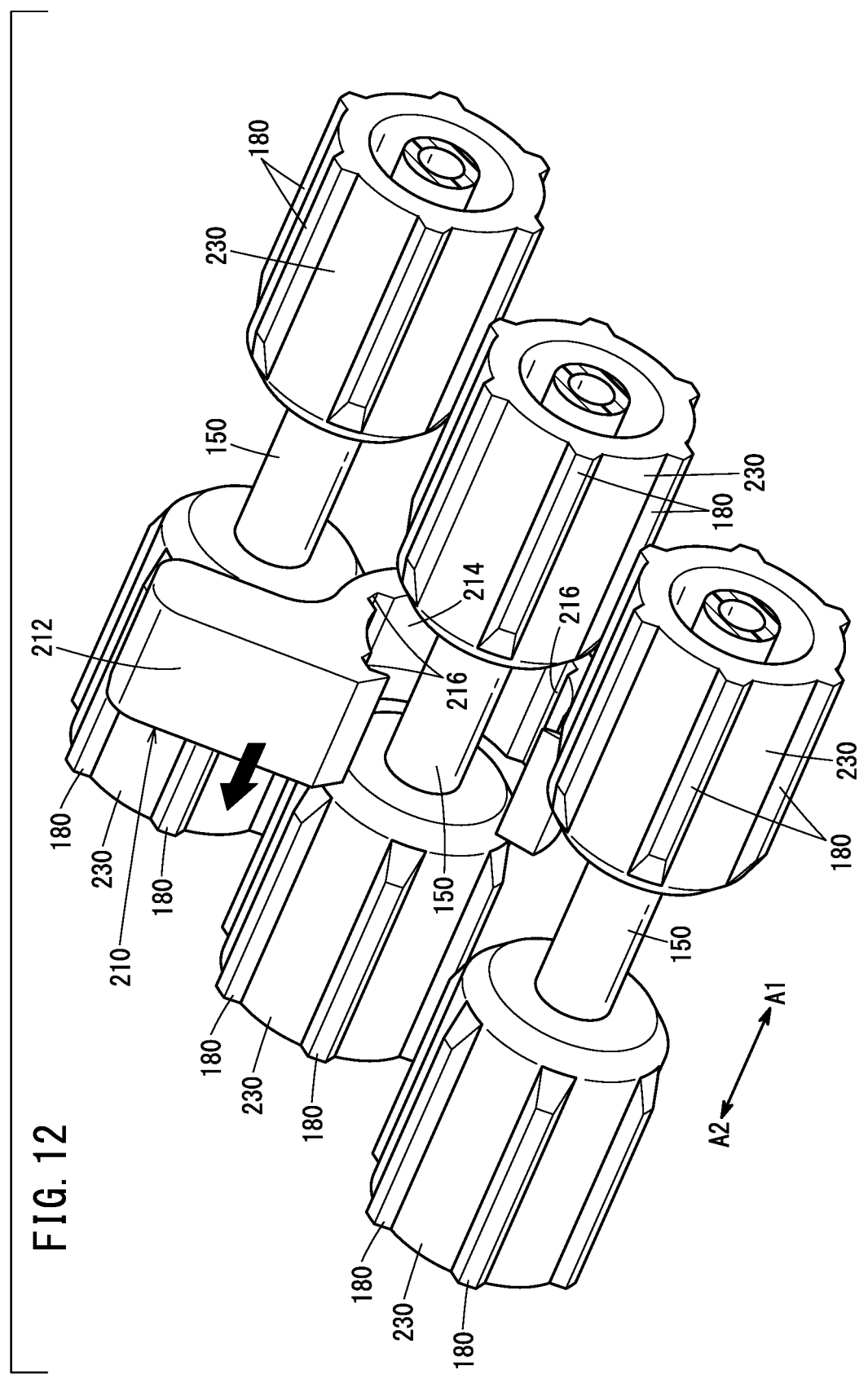
FIG. 12 is a schematic perspective view of important part, in a state where, with the conventional fitting nuts located opposite each other, the second tool for turning is put around a pipe member between fitting nuts.

Incidentally, some fluid control device may be disposed on the upstream side (or the downstream side) of the first to third air-operated valves 14a to 14c. As shown in FIG. 12, according to conventional techniques, if the fluid control device is located close to the first to third air-operated valves 14a to 14c along the flow direction, then the fitting nuts 230 of the fluid control device are positioned opposite to the fitting nuts 230 of the first to third air-operated valves 14a to 14c. Since the second tool 210 is thick and has a large tool width, its elasticity (flexibility) is poor. The opening of the large semicircular ring 214 is therefore hardly expandable. Hence, in this state, it is difficult to fit the large semicircular ring 214 directly around the fitting nut 230 of the second air-operated valve 14b, for example.

Figure 13:
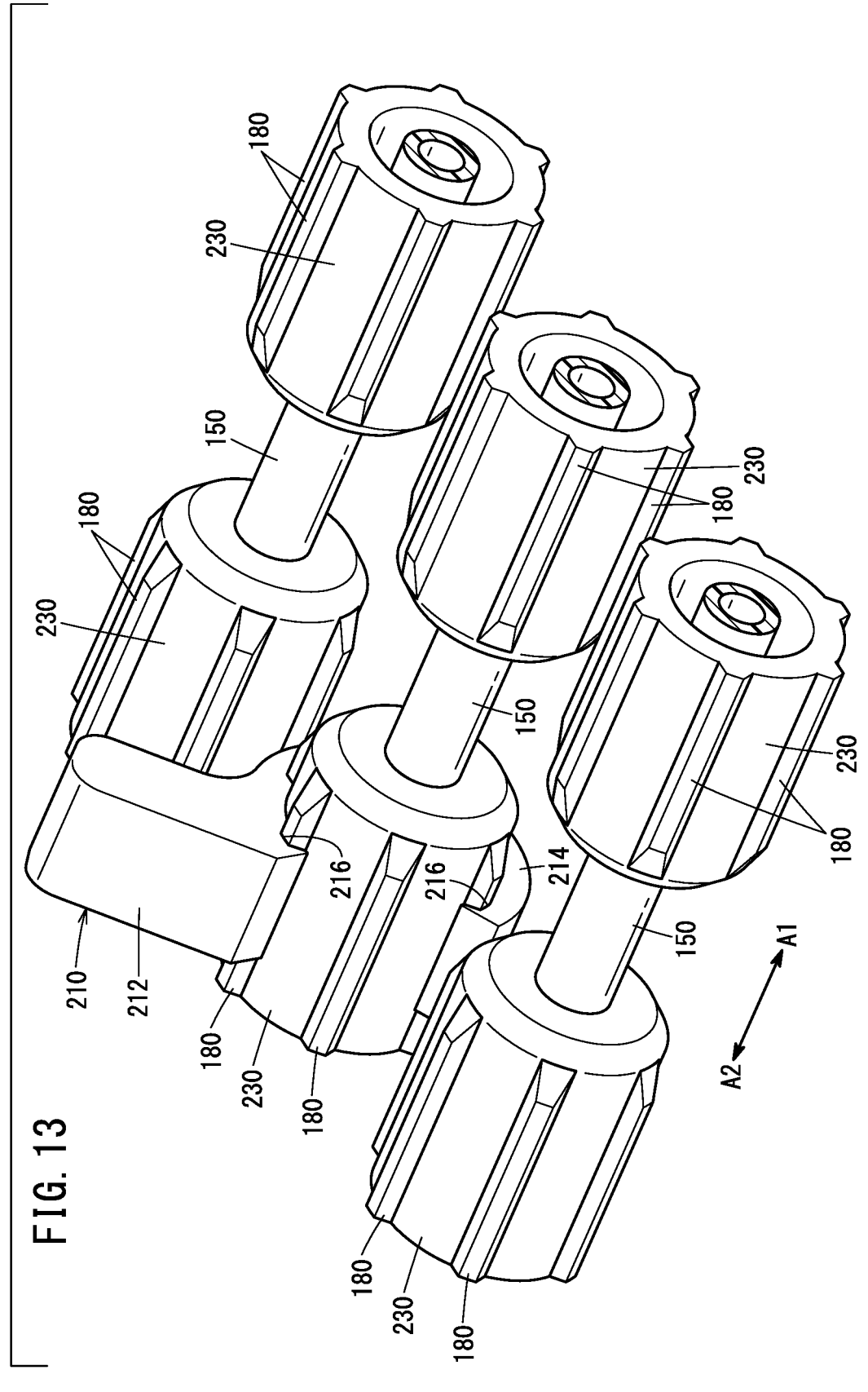
FIG. 13 is a schematic perspective view of important part, in a state where, from the state of FIG. 12, the second tool has been moved and fitted around a fitting nut on one side.

Accordingly, when retightening the fitting nut 230 of the second air-operated valve 14b, first (see FIG. 12), the large semicircular ring 214 is put around the fluid supply pipe 150 that is exposed between the fitting nut 230 of the fluid control device and the opposite fitting nut 230 of the second air-operated valve 14b. Subsequently, as shown in FIG. 13, the second tool 210 has to be moved to the fitting nut 230 (to the A2 side) of the second air-operated valve 14b. The engagement recesses 216 of the second tool 210 thus engage with the engagement protrusions 180 of the fitting nut 230.

Figure 14:
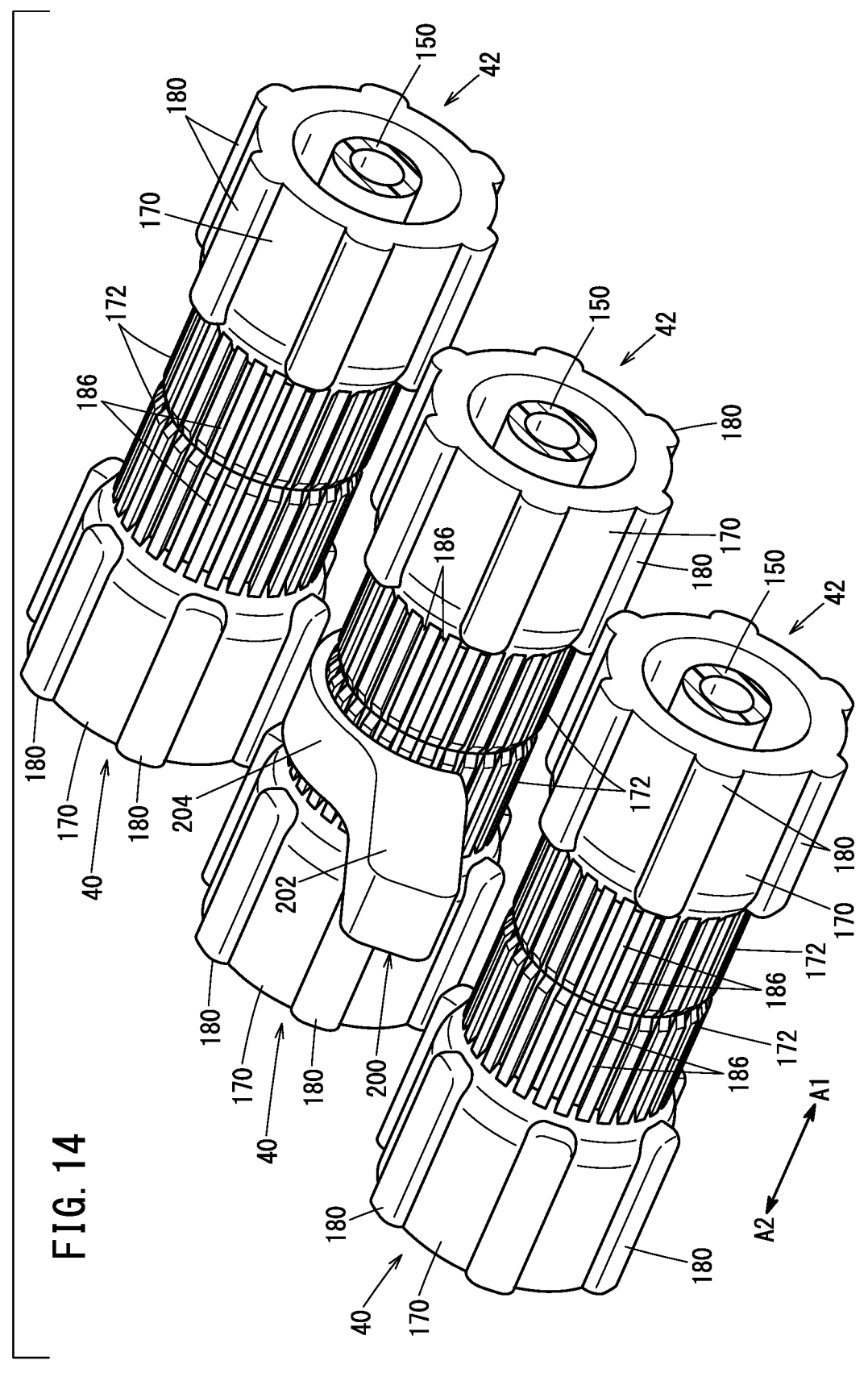
FIG. 14 is a schematic perspective view of important part, in a state where, with the fitting nuts (first nuts and second nuts) of the embodiment located opposite each other, a fitting nut (first nut) on one side is being turned.

In contrast, as shown in FIG. 14, when the fluid control device includes the second nuts 42 and the first to third air-operated valves 14a to 14c include the first nuts 40, and the fluid control device and the first to third air-operated valves 14a to 14c are located close to each other along the flow direction, then the small-diameter tube portions 172 of the second nuts 42 and the small-diameter tube portions 172 of the first nuts 40 face each other. Since the first tool 200 is thin and has a smaller tool width, its elasticity (flexibility) is relatively large. Accordingly, the opening 205 of the small semicircular ring 204 easily expands when fitting the small semicircular ring 204 around the small-diameter tube portion 172. It is therefore easy to cause the small-diameter tube portion 172 to enter the opening 205.

Furthermore, after the small semicircular ring 204 has been fitted around the small-diameter tube portion 172, the opening 205 closes due to its elasticity. Also, the engagement claws 206 engage with the engagement grooves 186. The first tool 200 is thus attached to the small-diameter tube portion 172. It is thus possible to fit the small semicircular ring 204 directly around the small-diameter tube portion 172 of the first nut 40 of the second air-operated valve 14b and then to turn the first nut 40 by applying torque to the small-diameter tube portion 172.

It is therefore not necessary to expose the fluid supply pipe 150 between the second nut 42 attached to the fluid control device and the opposite first nut 40 of the second air-operated valve 14b. Depending on the circumstances, the downstream end surfaces of the second nuts 42 and the upstream end surfaces of the first nuts 40 can be abutted against each other. This allows the fluid control device and the first to third air-operated valves 14a to 14c to be located closer to each other, which enables the fluid control system 10 to be made further compact, or in other words to be more integrated.

The first to third air-operated valves 14a to 14c operate as follows to control the flow rates of fluids.

When bringing the first air-operated valve 14a (or the second air-operated valve 14b or the third air-operated valve 14c) into the opened state to cause high-purity medical fluid or ultrapure water to flow, pilot air is supplied from the first supply/discharge pipe 144 into the upper chamber 82 through the first pilot port 86. This increases the internal pressure in the upper chamber 82, and the piston portion 108 of the valve rod 110 is pressed by the pilot air from its lower surface. As a result, as shown in FIG. 15, the valve rod 110 is displaced to the second housing 26 side (i.e., upward in FIGS. 4 and 15) by the amount corresponding to the pilot pressure of the pilot air. At this time, the first shaft portion 112 and the second shaft portion 114 forming the valve rod 110 and protruding from the piston portion 108 are guided by the inner peripheral walls of the first guide hole 90 and the second guide hole 120. Further, the outer peripheral wall of the piston portion 108 slides along the inner peripheral wall of the upper chamber 82. Further, the return spring 100 is pressed by the piston portion 108 and compressed.

As the valve rod 110 is displaced upward, the diaphragm 66, whose engaging protrusion 70 is fitted in the engaging hole 118 of the first shaft portion 112, is displaced in the same direction as the valve rod 110 (i.e., upward). The valve portion 68 of the diaphragm 66 thus separates away from the valve seat 58. As the diaphragm 66 is displaced upward, the internal volume of the lower chamber 80 decreases and so the air in the lower chamber 80 is discharged from the breathing port 84.

As the valve portion 68 separates away from the valve seat 58, the inlet passage 52 and the valve chamber 54 communicate with each other, and the inlet passage 52 and the outlet passage 56 also communicate with each other through the valve chamber 54. Then, the fluid that has reached the inlet passage 52 through the fluid supply pipe 150 is introduced into the valve chamber 54 and flows into the fluid discharge pipe 188 from the valve chamber 54 through the outlet passage 56. The high-purity medical fluid or ultrapure water is thus supplied to the manufacturing apparatus, processing apparatus, or the like.

When the first to third air-operated valves 14a to 14c are in the opened state, the upper end of the third shaft portion 116 is exposed from the second guide hole 120. The worker or user visually recognizes the exposed third shaft portion 116 to know that the first to third air-operated valves 14a to 14c are in the opened state.

When stopping the flow of the fluid like high-purity medical fluid, ultrapure water, etc., the valve portion 68 is seated on the valve seat 58. That is, the supply of pilot air from the first supply/discharge pipe 144 is stopped. Further, the pilot air in the upper chamber 82 is discharged through the first pilot port 86. The discharge reduces the internal pressure in the upper chamber 82, and then the resilient force of the return spring 100 exceeds the internal pressure in the upper chamber 82. As a result, the return spring 100 stretches to resiliently bias the piston portion 108 toward the first housing 24. The valve rod 110 including the piston portion 108 is thus displaced downward to return to the original position.

This displacement increases the internal volume of the lower chamber 80, causing the air to be introduced into the lower chamber 80 through the breathing port 84. Alternatively, the second pilot port 102 may be configured to function as a breathing port. In this case, it is not particularly necessary to attach the second supply/discharge pipe 146 to the second pilot port 102. Needless to say, the first shaft portion 112 and the second shaft portion 114 are guided by the inner peripheral walls of the first guide hole 90 and the second guide hole 120 also when the valve rod 110 is displaced downward.

As the valve rod 110 is returned to the original position (is displaced downward), the diaphragm 66 is displaced downward integrally with the valve rod 110 and the valve portion 68 thereof is seated on the valve seat 58. This cuts off the communication between the inlet passage 52 and the outlet passage 56 through the valve chamber 54. That is, the fluid in the inlet passage 52 is prevented from flowing downstream past the valve chamber 54.

When the first to third air-operated valves 14a to 14c are brought into the closed state, the upper end of the third shaft portion 116 returns into the second guide hole 120. The worker or user visually recognizes that the top surface of the third shaft portion 116 has become substantially flush with the top surface of the ceiling wall of the second housing 26, to know that the first to third air-operated valves 14a to 14c have returned to the closed state.

The present invention is not particularly limited to the embodiments described above and can be modified in various manners without departing from the essence and gist of the present invention.

For example, the fluid pressure device may be configured to use working oil as pilot fluid. The fluid pressure device may be a device other than a flow rate control valve, such as an actuator, etc.

Further, while in this embodiment, the fittings for connecting the pipe members in which the fluid subjected to flow rate control flows include the first nuts 40 and the second nuts 42, the fittings for connecting the first supply/discharge pipe 144 and the second supply/discharge pipe 146 to the first pilot port 86 and the second pilot port 102 may include the first nuts 40 and the second nuts 42.

Further, the first pilot port 86 and the second pilot port 102 may be arranged in a row with the second joint body 50.

Furthermore, as shown in FIG. 16, an end plate 250 may be constructed without the first tab 28 and the second tab 30. In this case, threaded holes (not shown) are formed in the lower surface of the end plate 250 and elongated holes (not shown) are formed through the base 12, and mounting screws (not shown) are inserted respectively into the elongated holes and screwed in the threaded holes. In this case, the absence of the first tab 28 and the second tab 30 allows the first air-operated valve 14*a* and the second air-operated valve 14*b*, and the second air-operated valve 14*b* and the third air-operated valve 14*c*, to be located closer.

Figure 17:
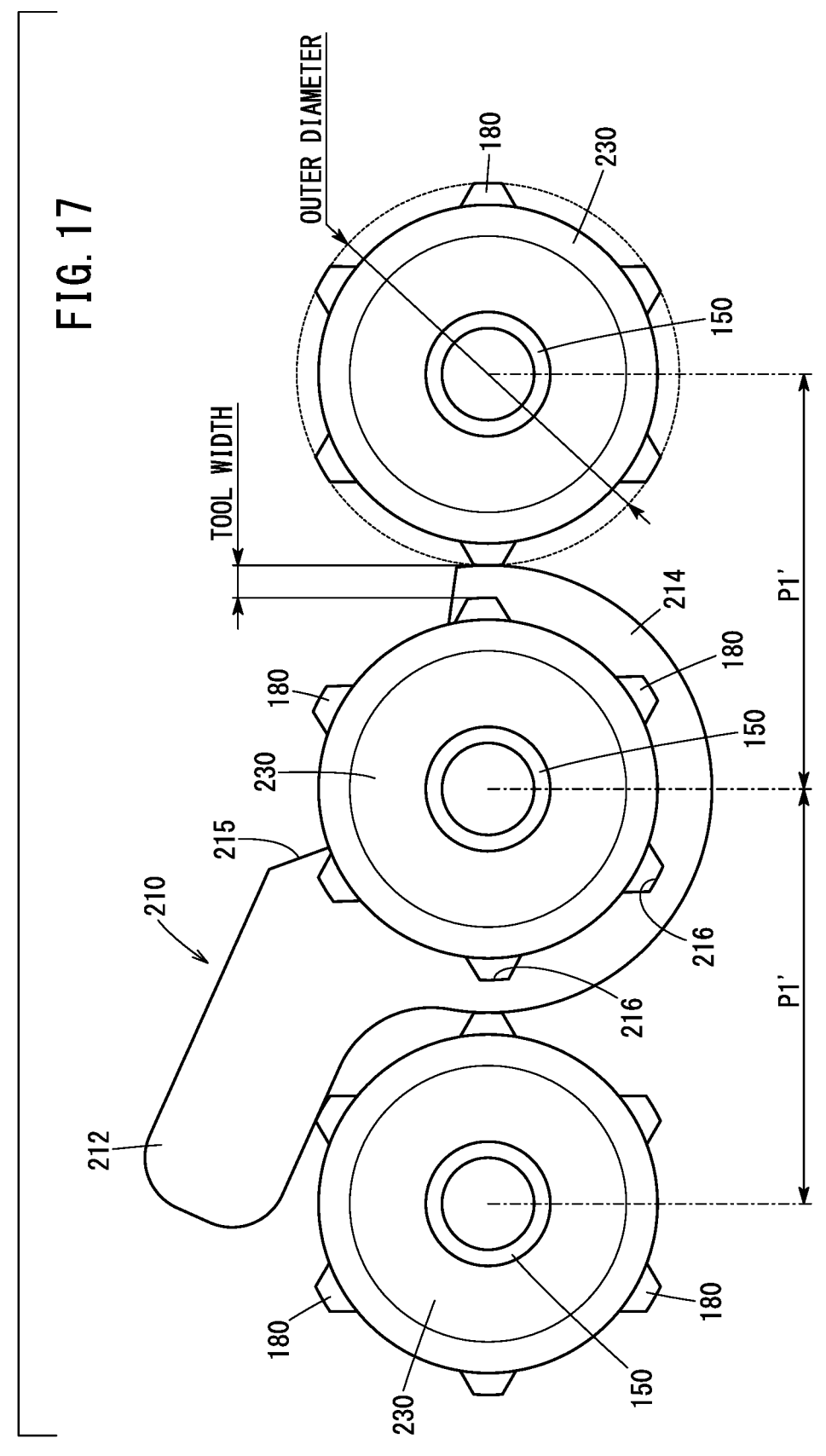
FIG. 17 is a front view of important part, in a state where, in the structure shown in FIG. 16, the fitting nuts shown in FIG. 8 are used and the fitting nut in the center is being turned by the second tool.

With this configuration, as shown in FIG. 17, when the fitting nuts 230 of the conventional technique are used, a pitch P1' between adjacent fitting nuts 230 can be set smaller than the pitch P1 in FIG. 8. However, in this case, too, it is necessary to ensure that the pitch P1' is not less than the sum of the outer diameter of the fitting nut 230 (the outer diameter of the large-diameter tube portion 170) and the tool width of the second tool 210. Accordingly, it may be not possible to most closely locate the first air-operated valve 14*a* and the second air-operated valve 14*b*, and the second air-operated valve 14*b* and the third air-operated valve 14*c*.

In contrast, as shown in FIG. 18, when the first nuts 40 (or the second nuts 42) are used, relatively large clearance is formed between adjacent small-diameter tube portions 172. When turning the first nut 40 (or the second nut 42), the small semicircular ring 204 of the first tool 200 can be inserted in the clearance and fitted around the small-diameter tube portion 172 as explained earlier.

Accordingly, in this case, too, it is possible to set a pitch P2' between adjacent first nuts 40 (or adjacent second nuts 42) to be substantially equivalent to the outer diameter of the large-diameter tube portion 170. It is therefore possible to make the fluid control system 10 compact by omitting the first tab 28 and the second tab 30 and most closely locating the first air-operated valve 14*a* and the second air-operated valve 14*b*, and the second air-operated valve 14*b* and the third air-operated valve 14*c*.

Needless to say, in the configuration shown in FIG. 18, the first nut 40 (or the second nut 42) can be easily tightened by engaging the engagement claws 206 of the first tool 200 with the engagement grooves 186 formed around the small-diameter tube portion 172 of the first nut 40 (or the second nut 42).

The first to third air-operated valves 14*a* to 14*c* may be constructed as normally-opened valves. In this case, the return spring 100 is provided on the lower surface side of the piston portion 108 so as to resiliently bias the piston portion 108 toward the second housing 26. While the second supply/discharge pipe 146 is attached to the second pilot port 102, the first pilot port 86 may be closed by a plug member.

Alternatively, the first to third air-operated valves 14*a* to 14*c* may be constructed as so-called double-acting valves. In this case, the first to third air-operated valves 14*a* to 14*c* are brought into the opened state by supplying pilot fluid from the first pilot port 86 into the upper chamber 82, while the first to third air-operated valves 14*a* to 14*c* are brought into the closed state by supplying pilot fluid into the second housing 26 from the second pilot port 102. It is therefore not particularly necessary to incorporate the return spring 100 in this configuration.

What is claimed is:

1. A fitting nut made of a resin material and having a female thread that is engaged with a male thread formed on an outer peripheral wall of a joint body made of a resin material, the fitting nut comprising:

a large-diameter tube portion that is hollow and includes the female thread formed on an inner peripheral wall thereof; and a small-diameter tube portion that has a hollow cylindrical shape with a smaller diameter than the large-diameter tube portion and includes, in an end surface thereof, an insertion hole in which a pipe member may be inserted, wherein the small-diameter tube portion includes, in an outer peripheral wall thereof:

a plurality of ridges protruding outward in a diameter direction of the small-diameter tube portion, extending in a longitudinal direction that is orthogonal to the diameter direction, and terminating at a diametrical transition portion provided between the large-diameter tube portion and the small-diameter tube portion based on a difference in diameter between the large-diameter tube portion and the small-diameter tube portion; and a plurality of engagement grooves formed between the ridges adjacent to each other, the plurality of engagement grooves being depressed inwardly in the diameter direction of the small-diameter tube portion and extending straight along the longitudinal direction, and terminating at the diametrical transition portion, wherein an outer diameter of the ridges of the small-diameter tube portion is smaller than a smallest outer diameter of the large-diameter tube portion, wherein said smallest outer diameter is constant along at least a portion of an axial length of the large-diameter tube portion, and wherein the outer diameter of said ridges is smaller than an outer diameter of the diametrical transition portion, and the small-diameter tube portion includes a portion in which the outer diameter of the ridges is constant along the axial direction of the small-diameter tube portion.

2. The fitting nut according to claim 1, wherein the large-diameter tube portion has a plurality of engagement protrusions formed on an outer peripheral wall thereof, the plurality of engagement protrusions protruding outwardly in a diameter direction of the large-diameter tube portion and extending along a longitudinal direction that is orthogonal to the diameter direction.

3. The fitting nut according to claim 2, wherein the ridges of the small-diameter tube portion are larger in number than the engagement protrusions of the large-diameter tube portion.

4. The fitting nut according to claim 1, wherein each of the plurality of engagement grooves is open at an end remote from the large-diameter tube portion.

5. A fitting comprising:

a fitting nut made of a resin material and having a female thread formed thereon; and a joint body made of a resin material and having, on an outer peripheral wall thereof, a male thread that is engaged with the female thread, wherein the fitting nut includes a large-diameter tube portion that is hollow and includes the female thread formed on an inner peripheral wall thereof, and a small-diameter tube portion that has a hollow cylindrical shape with a smaller diameter than the large-diameter tube portion and includes, in an end surface thereof, an insertion hole in which a pipe member may be inserted, and the small-diameter tube portion includes, in an outer peripheral wall thereof:

a plurality of ridges protruding outward in a diameter direction of the small-diameter tube portion, extending in a longitudinal direction that is orthogonal to the diameter direction, and terminating at a diametrical transition portion provided between the large-diameter tube portion and the small-diameter tube portion based on a difference in diameter between the large-diameter tube portion and the small-diameter tube portion; and a plurality of engagement grooves formed between the ridges adjacent to each other, the plurality of engagement grooves being depressed inwardly in the diameter direction of the small-diameter tube portion and extending straight along the longitudinal direction, and terminating at the diametrical transition portion, wherein an outer diameter of the ridges of the small-diameter tube portion is smaller than a smallest outer diameter of the large-diameter tube portion, wherein said smallest outer diameter is constant along at least a portion of an axial length of the large-diameter tube portion, and wherein an outer diameter of said ridges is smaller than an outer diameter of the diametrical transition portion, and the small-diameter tube portion includes a portion in which the outer diameter of the ridges is constant along the axial direction of the small-diameter tube portion.

6. The fitting according to claim 5, wherein the large-diameter tube portion of the fitting nut includes a plurality of engagement protrusions formed on an outer peripheral wall thereof, the plurality of engagement protrusions protruding outwardly in a diameter direction of the large-diameter tube portion and extending along a longitudinal direction that is orthogonal to the diameter direction.

7. The fitting according to claim 6, wherein the ridges of the small-diameter tube portion are larger in number than the engagement protrusions of the large-diameter tube portion.

8. A fluid pressure device in which a fluid supply pipe configured to supply a fluid, a fluid discharge pipe configured to discharge the fluid, and a pilot fluid passage pipe configured to allow a pilot fluid to flow therethrough, are connected respectively through fittings, wherein at least one of the fittings includes a fitting nut made of a resin material and having a female thread formed thereon, and a joint body made of a resin material and having, on an outer peripheral wall thereof, a male thread that is engaged with the female thread, the fitting nut includes a large-diameter tube portion that is hollow and includes the female thread formed on an inner peripheral wall thereof, and a small-diameter tube portion that has a hollow cylindrical shape with a smaller diameter than the large-diameter tube portion and includes, in an end surface thereof, an insertion hole in which the fluid supply pipe, the fluid discharge pipe, or the pilot fluid passage pipe may be inserted, and the small-diameter tube portion includes, in an outer peripheral wall thereof:

a plurality of ridges protruding outward in a diameter direction of the small-diameter tube portion, extending in a longitudinal direction that is orthogonal to the diameter direction, and terminating at a diametrical transition portion provided between the large-diameter tube portion and the small-diameter tube portion based on a difference in diameter between the large-diameter tube portion and the small-diameter tube portion; and a plurality of engagement grooves formed between the ridges adjacent to each other, the plurality of engagement grooves being depressed inwardly in the diameter direction of the small-diameter tube portion and extending straight along the longitudinal direction, and terminating at the diametrical transition portion, wherein an outer diameter of the ridges of the small-diameter tube portion is smaller than a smallest outer diameter of the large-diameter tube portion, wherein said smallest outer diameter is constant along at least a portion of an axial length of the large-diameter tube portion, and wherein an outer diameter of said ridges is smaller than an outer diameter of the diametrical transition portion, and the small-diameter tube portion includes a portion in which the outer diameter of the ridges is constant along the axial direction of the small-diameter tube portion.

9. The fluid pressure device according to claim 8, wherein the large-diameter tube portion of the fitting nut includes a plurality of engagement protrusions formed on an outer peripheral wall thereof, the plurality of engagement protrusions protruding outwardly in a diameter direction of the large-diameter tube portion and extending along a longitudinal direction that is orthogonal to the diameter direction.

10. The fluid pressure device according to claim 9, wherein the ridges of the small-diameter tube portion are larger in number than the engagement protrusions of the large-diameter tube portion.

11. The fluid pressure device according to claim 8, wherein the fluid supply pipe or the fluid discharge pipe, and the pilot fluid passage pipe are arranged in a row.

12. The fluid pressure device according to claim 8, further comprising a positioning and fixing member that is positioned and fixed on a certain member, wherein the positioning and fixing member includes, on point-symmetrical positions thereof, a first tab and a second tab protruding in opposite directions and each having a through hole formed along a thickness direction thereof.

13. A fluid control system comprising at least two fluid pressure devices that are arranged adjacent to each other in a row, wherein, in each of the fluid pressure devices, a fluid supply pipe configured to supply a fluid, a fluid discharge pipe configured to discharge the fluid, and a pilot fluid passage pipe configured to allow a pilot fluid to flow therethrough, are connected respectively through fittings, at least one of the fittings includes a fitting nut made of a resin material and having a female thread formed thereon, and a joint body made of a resin material and having, on an outer peripheral wall thereof, a male thread that is engaged with the female thread, the fitting nut includes a large-diameter tube portion that is hollow and includes the female thread formed on an inner peripheral wall thereof, and a small-diameter tube portion that has a hollow cylindrical shape with a smaller diameter than the large-diameter tube portion and includes, in an end surface thereof, an insertion hole in which the fluid supply pipe, the fluid discharge pipe, or the pilot fluid passage pipe may be inserted, and the small-diameter tube portion includes, in an outer peripheral wall thereof:

a plurality of ridges protruding outward in a diameter direction of the small-diameter tube portion, extending in a longitudinal direction that is orthogonal to the diameter direction, and terminating at a diametrical transition portion provided between the large-diameter tube portion and the small-diameter tube portion based on a difference in diameter between the large-diameter tube portion and the small-diameter tube portion; and a plurality of engagement grooves formed between the ridges adjacent to each other, the plurality of engagement grooves being depressed inwardly in the diameter direction of the small-diameter tube portion and extending straight along the longitudinal direction, and terminating at the diametrical transition portion, wherein an outer diameter of the ridges of the small-diameter tube portion is smaller than a smallest outer diameter of the large-diameter tube portion, wherein said smallest outer diameter is constant along at least a portion of an axial length of the large-diameter tube portion, and wherein the outer diameter of said ridges is smaller than an outer diameter of the diametrical transition portion, and the small-diameter tube portion includes a portion in which the outer diameter of the ridges is constant along the axial direction of the small-diameter tube portion.

14. The fluid control system according to claim 13, wherein the large-diameter tube portion of each of the fitting nuts includes a plurality of engagement protrusions formed on an outer peripheral wall thereof, the plurality of engagement protrusions protruding outwardly in a diameter direction of the large-diameter tube portion and extending along a longitudinal direction that is orthogonal to the diameter direction.

15. The fluid control system according to claim 14, wherein the ridges of the small-diameter tube portion are larger in number than the engagement protrusions of the large-diameter tube portion.

16. The fluid control system according to claim 13, wherein, in each of the fluid pressure devices, the fluid supply pipe or the fluid discharge pipe, and the pilot fluid passage pipe are arranged in a row.

17. The fluid control system according to claim 13, wherein each of the fluid pressure devices further include a positioning and fixing member that is positioned and fixed on a certain member, and the positioning and fixing member includes, on point-symmetrical positions thereof, a first tab and a second tab protruding in opposite directions and each having a through hole formed along a thickness direction thereof.

18. The fluid control system according to claim 13, wherein a pitch between the fitting nut of one of the fluid pressure devices and the fitting nut of another of the fluid pressure devices that is adjacent to the one fluid pressure device is substantially equivalent to an outer diameter of a maximum outer diameter portion of the fitting nuts.

* * * * *